Jan. 16, 1968     J. F. REUS ETAL     3,363,549
PLATEN CONTROL MEANS IN POSTAGE METER MACHINES
Filed Sept. 10, 1965     10 Sheets-Sheet 8
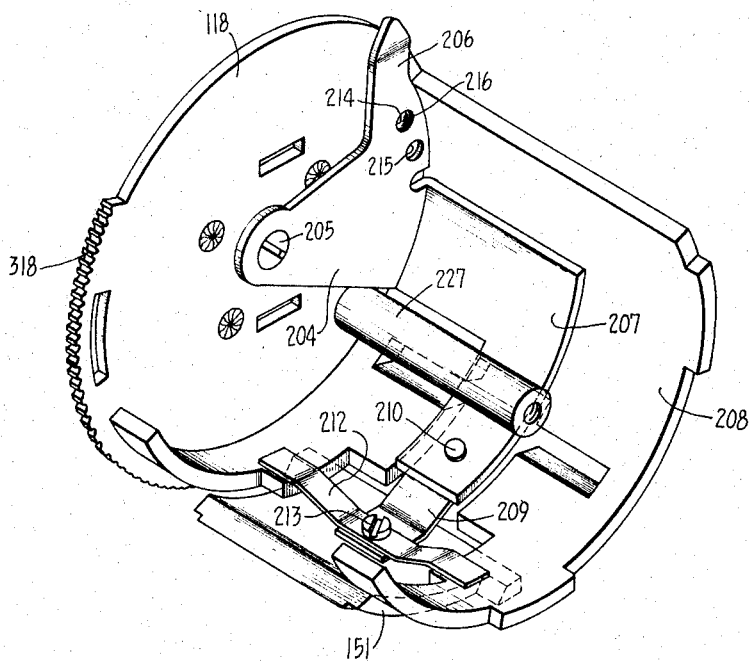
FIG_18
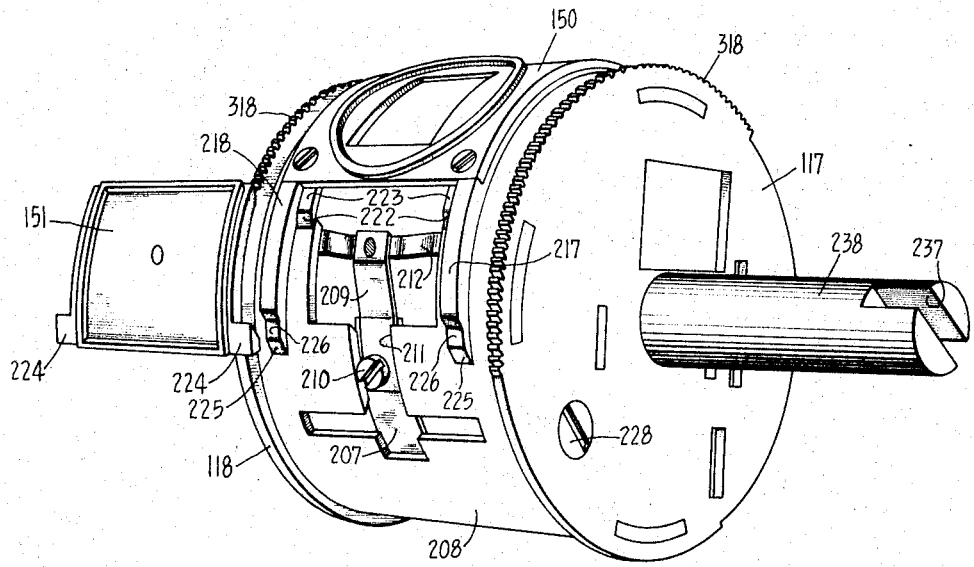
FIG_17

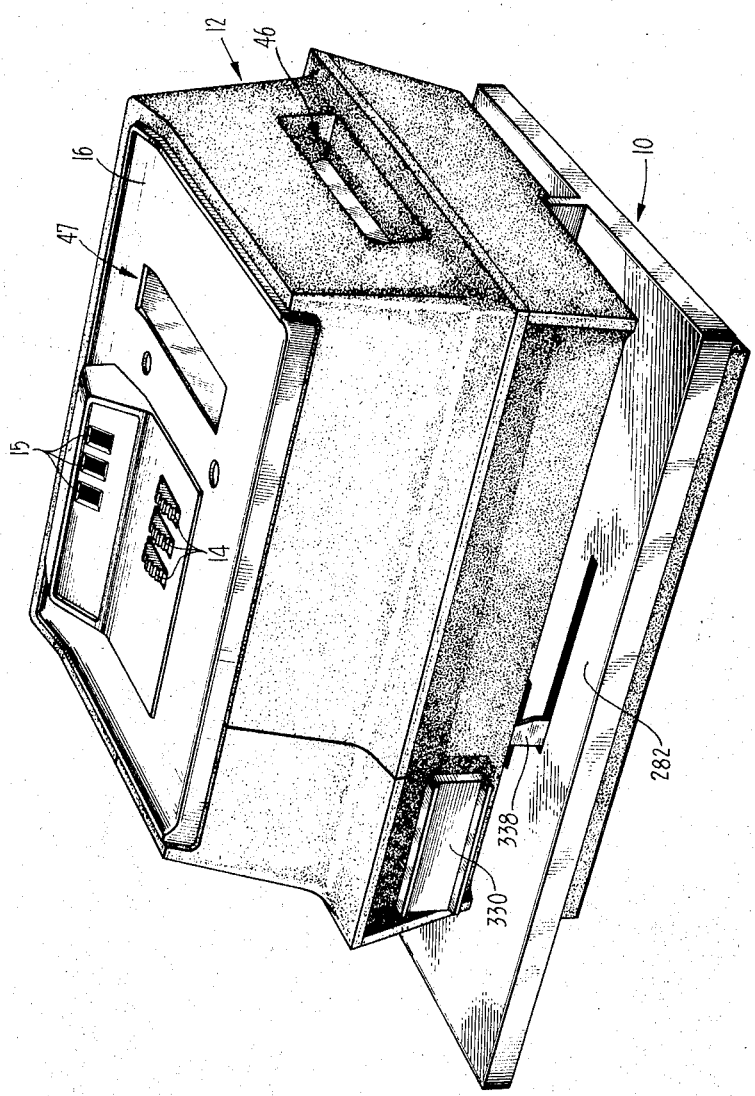
FIG_1

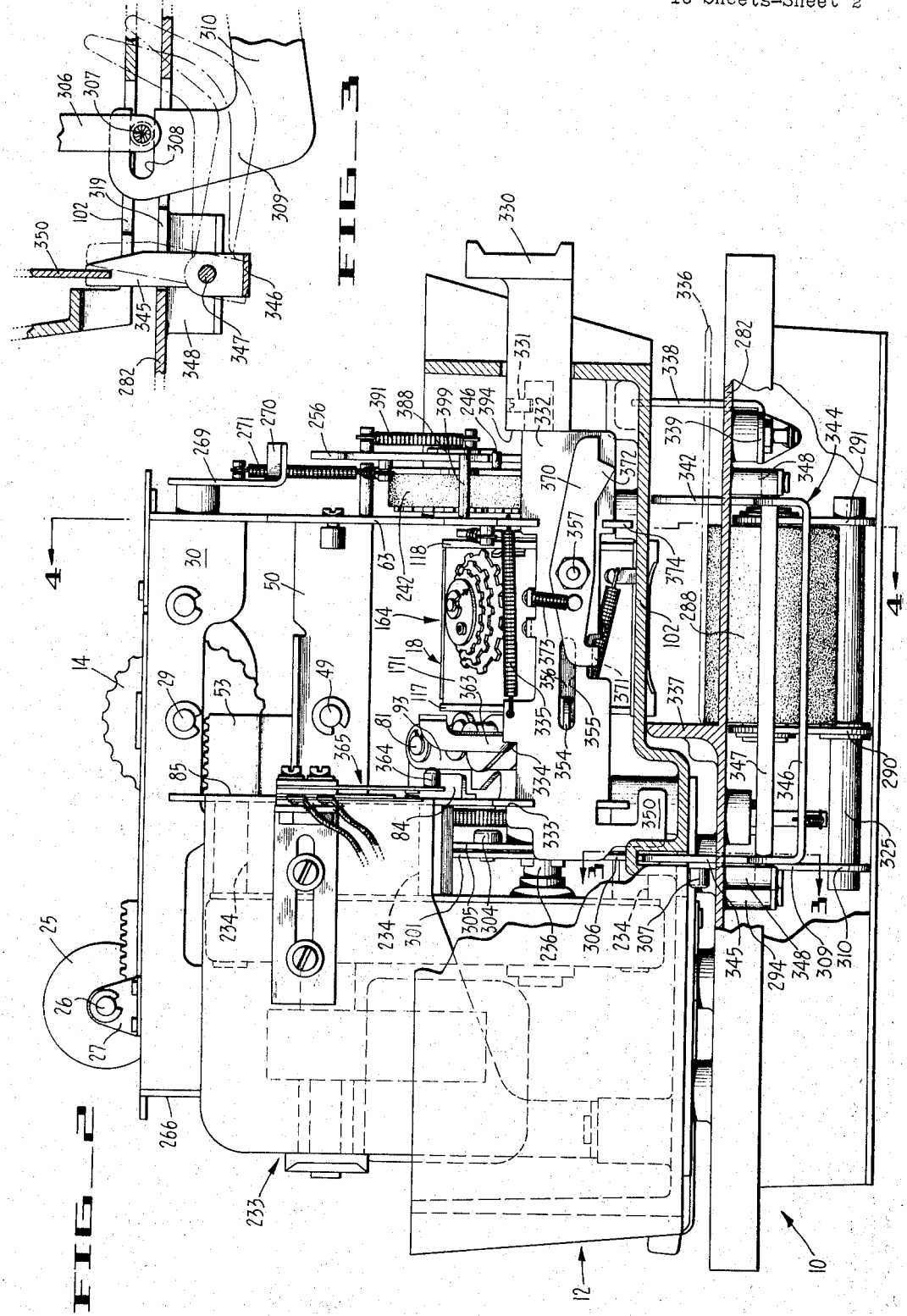

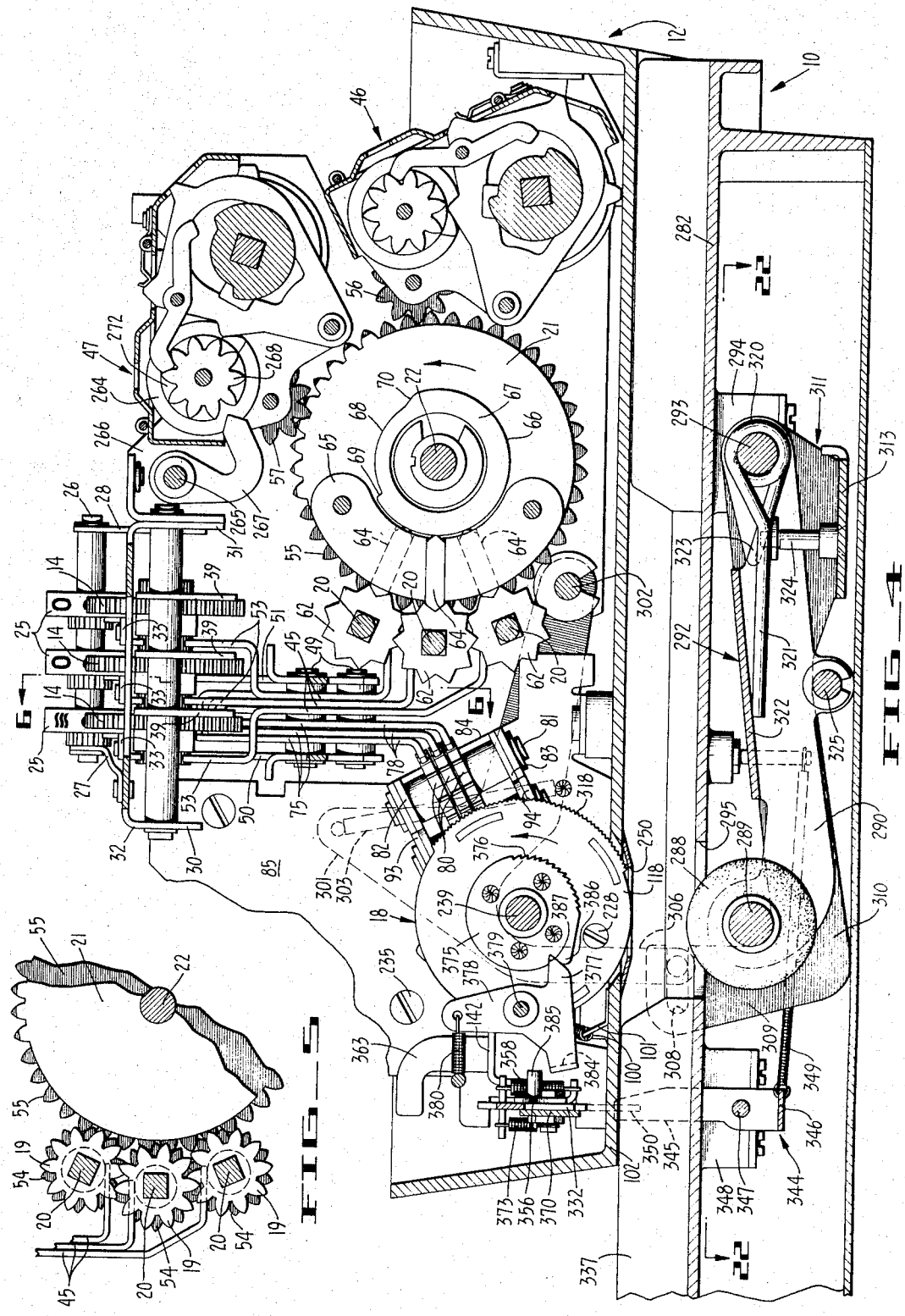

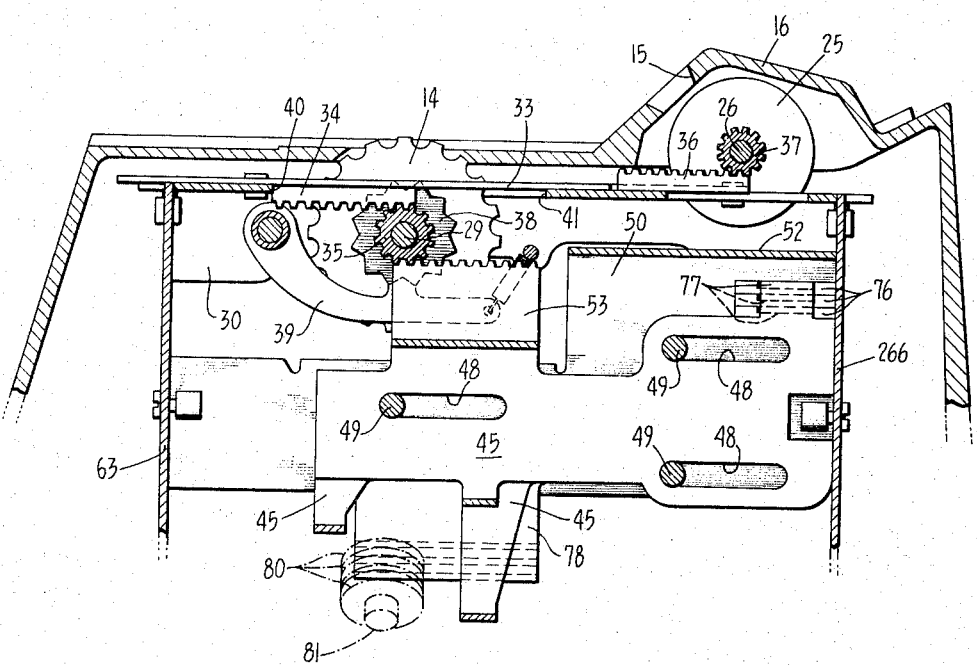
FIG_6
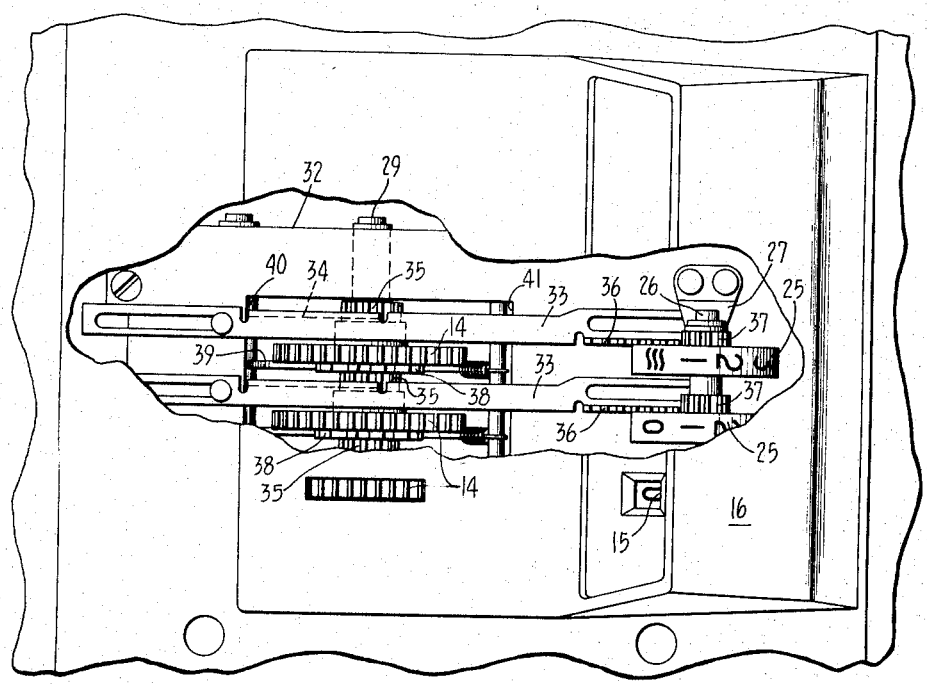
FIG_7

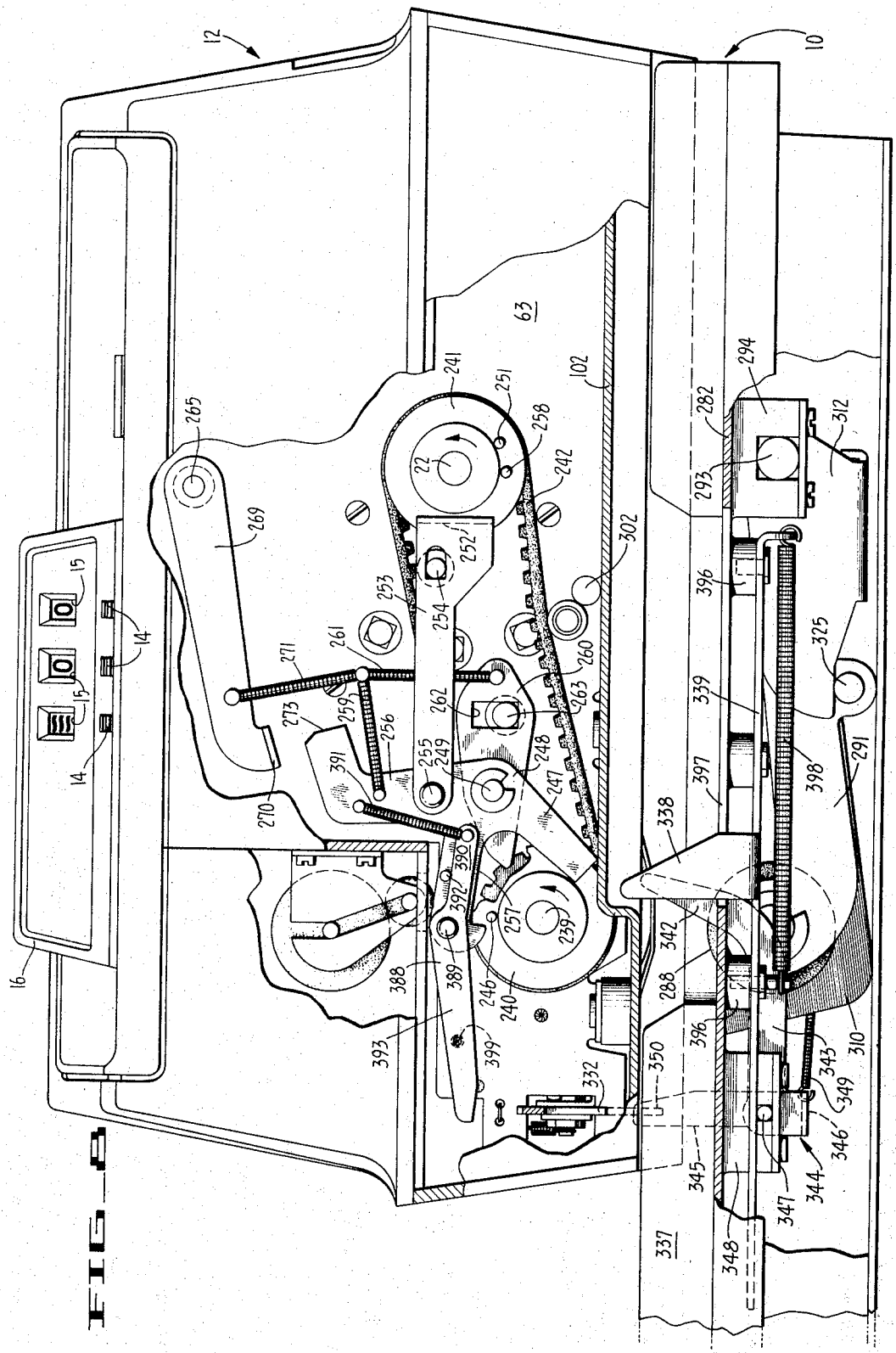

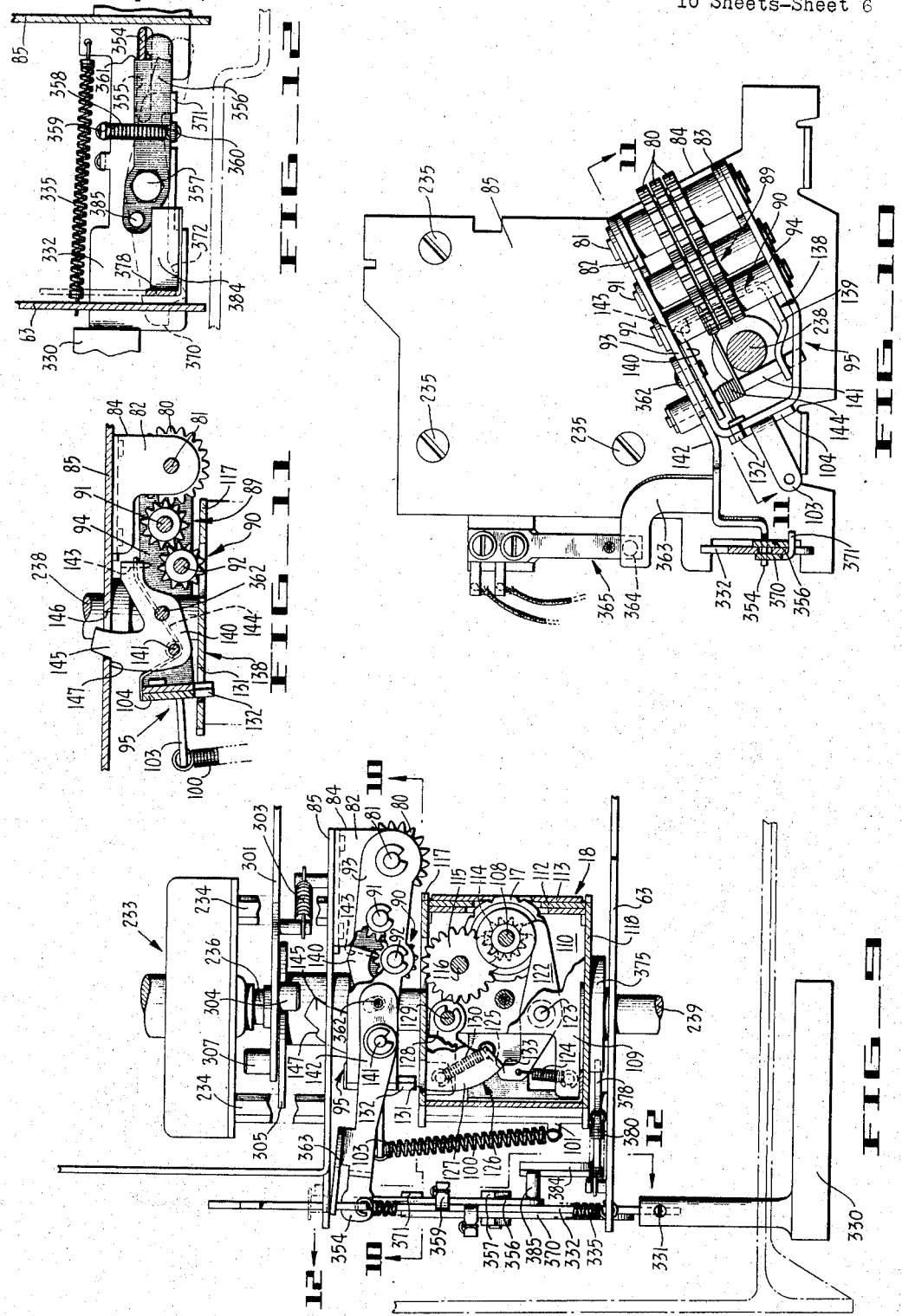

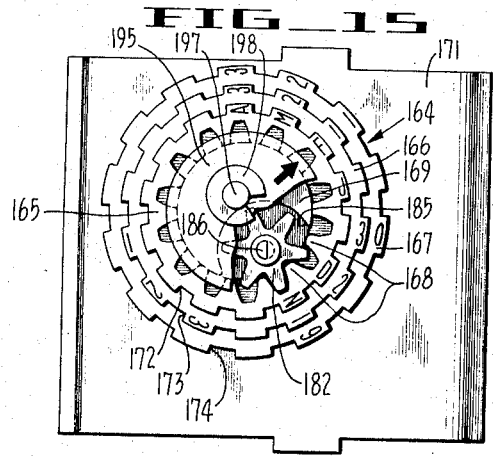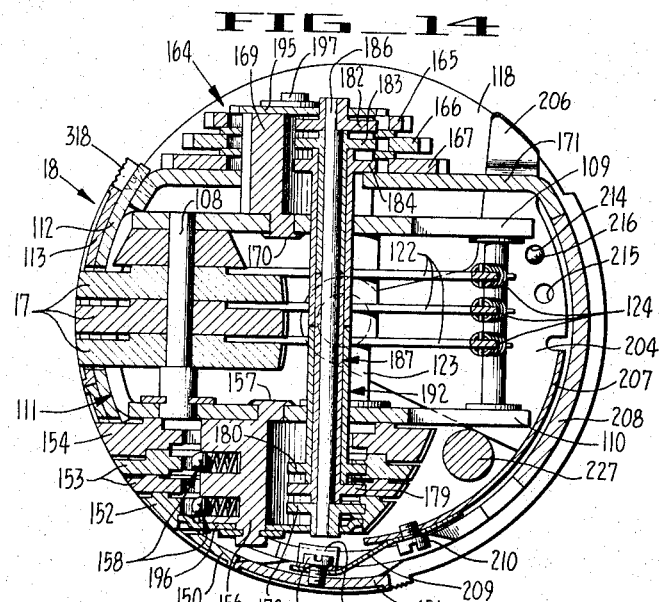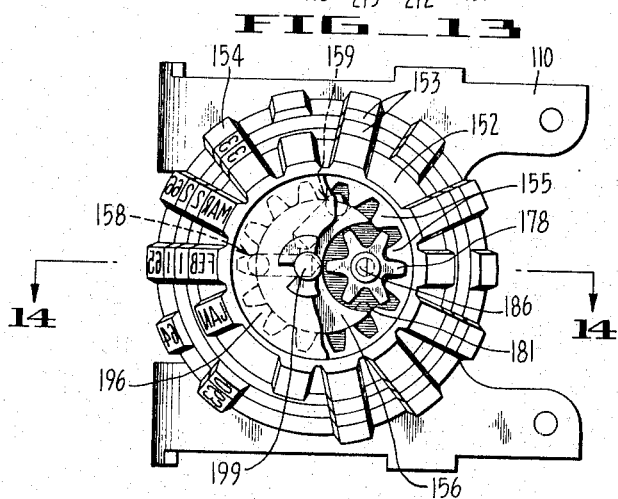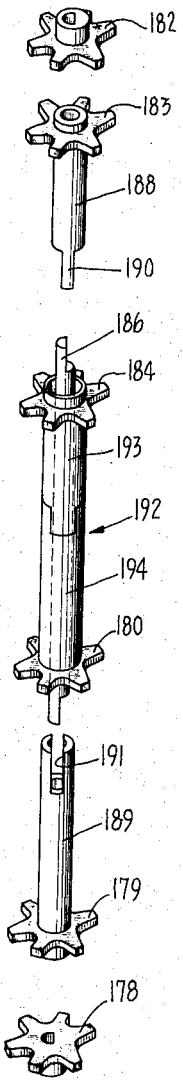

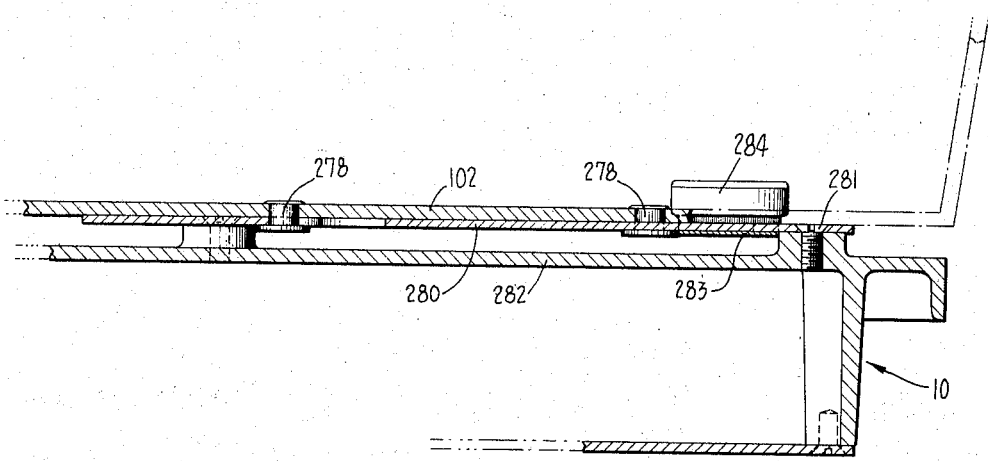
FIG_20
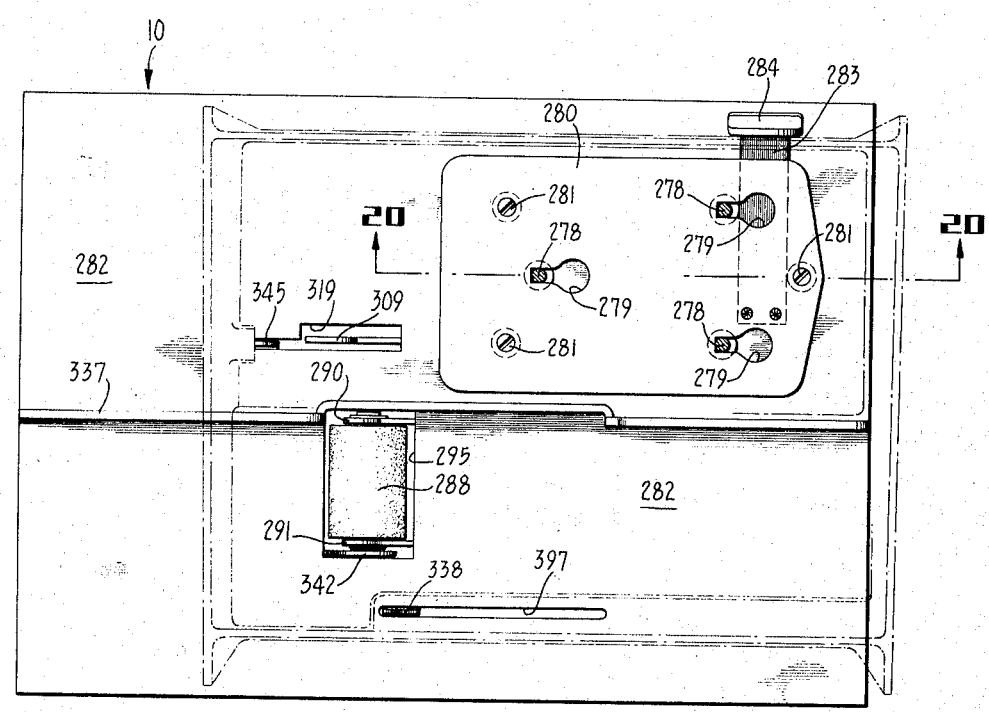
FIG_19

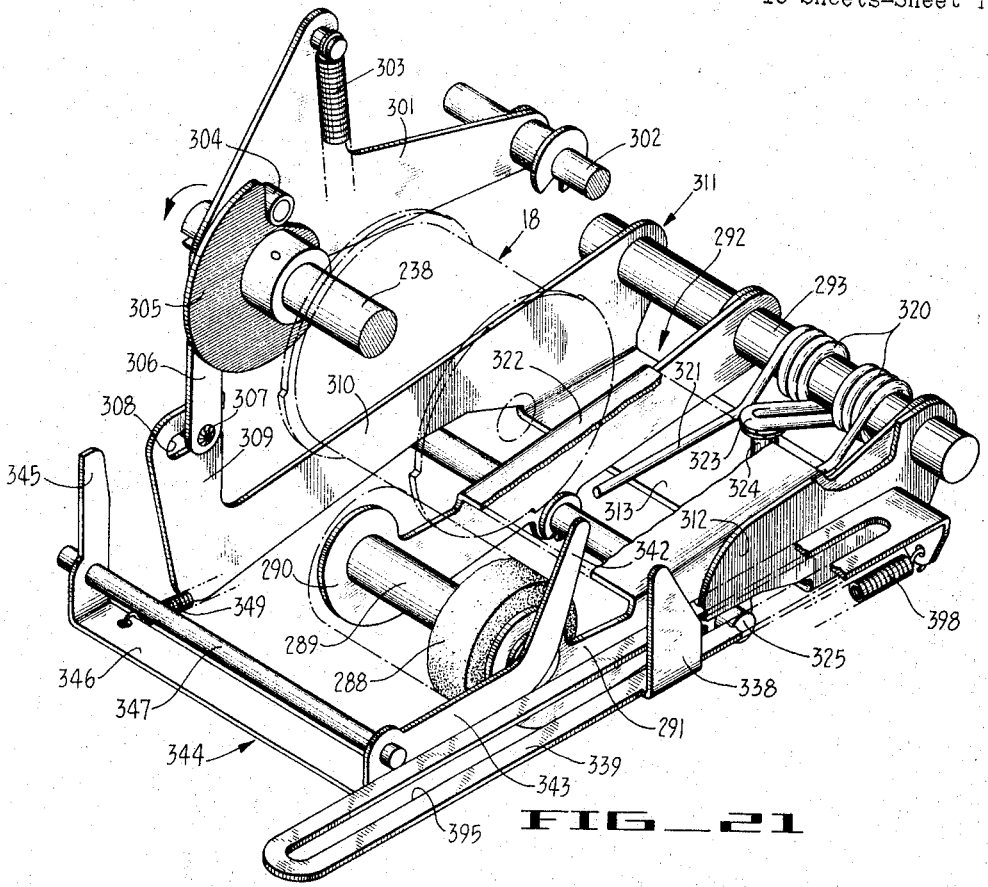
FIG_21
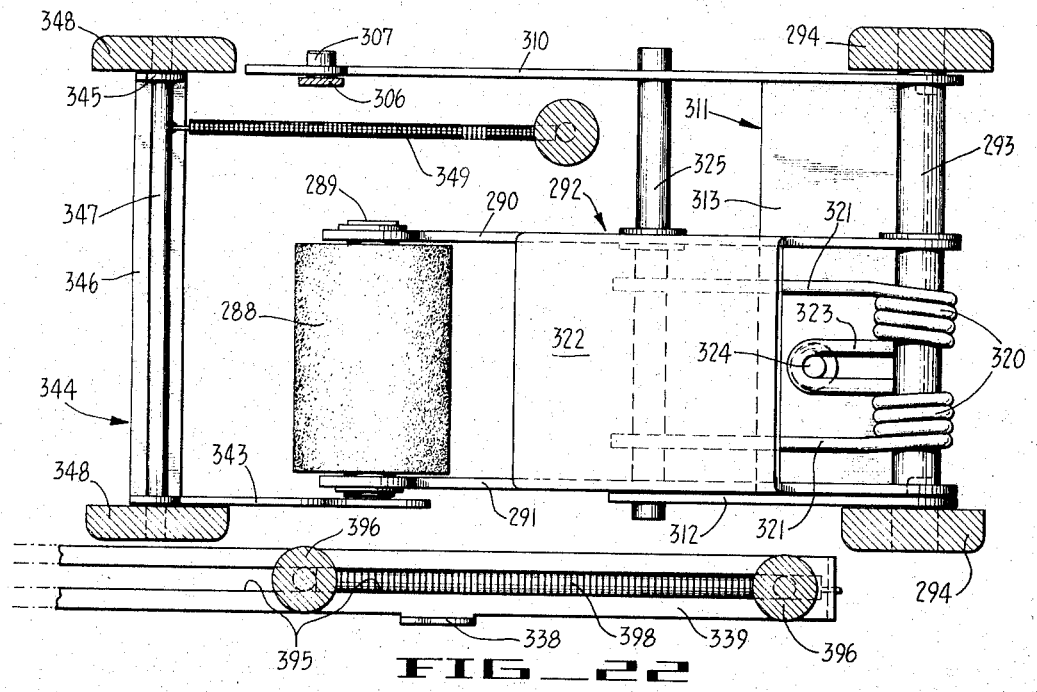
FIG_22

United States Patent Office 3,363,549
Patented Jan. 16, 1968

3,363,549
PLATEN CONTROL MEANS IN POSTAGE METER MACHINES
John F. Reus, Hayward, Maynard E. Anderson, Pleasanton, and Charles S. Balaz, Dublin, Calif., assignors to Friden, Inc., a corporation of Delaware
Filed Sept. 10, 1965, Ser. No. 486,437
21 Claims. (Cl. 101—91)

ABSTRACT OF THE DISCLOSURE

The invention relates to a postage metering machine and more particularly to the controls therefor. A manually depressible key is provided which is effective to initiate operation of the machine when a piece of mail matter has been introduced to the printing station. Upon depression of the key, a latching mechanism becomes effective to releasably retain the key depressed for a single revolution of the print head. Normally, the printing platen is maintained in an inoperative position relative to the print head, but is moved into operative position upon initiation of a machine operation and is held in this position for one complete revolution of the print head. Upon completion of a single revolution, a cam means associated with the print head becomes operative to release the key latch, thereby terminating the machine operation and enabling restoration of the platen to its inoperative position, freeing the mail matter for ejection from the machine.

---

This invention relates to a postage metering machine and more particularly to the controls therefor.

The present invention is an adaptation of a postage metering machine of the type disclosed in the patent to Ingemar H. Lundquist, No. 3,107,854 issued Oct. 22, 1963. Most of the metered mailing machines of this type are fairly large and involve devices capable of handling large volumes of mail matter, each piece of which serves to automatically control the operation of the machine for the sequential passage of the mail matter therethrough. Because of their complexity they are expensive machines and provide features which are not necessary for the satisfactory handling of a small quantity of pieces of mail matter. It is, therefore, an object of the present invention to provide a compact inexpensive metered mailing machine.

Another object of the invention is to provide a metered mailing machine, the operation of which is manually controlled.

Another object of the invention is to provide an improved manual control means for a metered mailing machine rendered operable by the insertion of a piece of mail matter into printing position in such machine.

A further object of the invention is to provide an ejection means for a metered mailing machine operable to eject a piece of mail matter subsequent to the printing of a postmark thereon.

Other objects and advantages of the invention will become apparent from the following description of a preferred embodiment as illustrated in the accompanying drawings in which:

FIG. 1 is a view in perspective of the metered mailing machine;

FIG. 2 is an end elevational view of the machine as viewed from the left in FIG. 1 with the cover broken away;

FIG. 3 is a detailed showing of the manual control lock, the view being taken on the plane indicated by line 3—3 in FIG. 2;

FIG. 4 is a sectional elevational view of the machine showing the selection mechanism, registers and actuating means therefor, the view being taken on the planes indicated by lines 4—4 in FIG. 2;

FIG. 5 is a fragmentary sectional detail of the actuator mechanism;

FIG. 6 is a fragmentary transverse sectional elevational view of the selection mechanism, the view being taken on the planes indicated by lines 6—6 in FIG. 4;

FIG. 7 is a fragmentary plan view of the machine showing the manually settable controls for the selection mechanism and the register dial differentially settable thereby;

FIG. 8 is an elevational view of the machine with a portion of the meter cover broken away to show the actuator drive mechanism, and with a portion of the base broken away to show the platen roller and ejector mechanism;

FIG. 9 is a plan view of the operation initiating mechanism and the indicia setting mechanism with the print-head in section to show the indicia type wheels;

FIG. 10 is an elevational view of the indicia setting mechanism, the view being taken on the planes indicated by lines 10—10 in FIG. 9;

FIG. 11 is a sectional detail of the indicia setting mechanism showing the gear train and locking means therefor, the view being taken on the plane indicated by line 11—11 in FIG. 10;

FIG. 12 is an elevational view of the operation control lock, the view being taken on the planes indicated by lines 12—12 in FIG. 9;

FIG. 13 is a plan view of a structural member of the print-head showing the date setting dials;

FIG. 14 is a transaxial sectional view of the printhead, the view being taken on the plane indicated by line 14—14 in FIG. 13;

FIG. 15 is a plan view of the data type wheels in the print-head;

FIG. 16 is a detail of the quill shaft assembly connecting the date setting dials with the date type wheels;

FIG. 17 is an isometric view of the print-head showing the slogan plate removed;

FIG. 18 is an isometric view of the print-head in partial assembly to show the print and nonprint control for the slogan plate;

FIG. 19 is a plan view of the machine base showing the postage meter mount thereon;

FIG. 20 is a fragmentary sectional elevational view of the base, the view being taken on the plane indicated by line 20—20 in FIG. 19;

FIG. 21 is an isometric view of the platen roller control mechanism; and

FIG. 22 is a plan view of the platen roller control mechanism, the view being taken on the plane indicated by line 22—22 in FIG. 4.

The invention is disclosed as embodied in a metered mailing machine having a base portion 10 (FIG. 1) and a postage meter unit 12 of the type disclosed in the Patent No. 3,107,854 issued to Ingemar H. Lundquist, Oct. 22, 1963, the meter unit 12 being detachably mounted on the base portion 10. The postage meter unit 12 is of the type commonly referred to as a "3-bank" meter in which a maximum of $9.99 in prepaid postage may be set up in the selector mechanism. In order to adjust the selector mechanism of the postage meter unit 12 to represent the desired amount of prepaid postage, the selector wheels 14 are selectively rotated until the desired value is visually indicated in the corresponding sight openings 15 in the register cover 16 (FIG. 1). At the same time, the corresponding type wheels 17 (FIGS. 9 and 14) in the indicia print-head 18 are adjusted in accordance with the visual indication in the sight openings 15. Likewise, an adjustment of each of the selector wheels 14 effects an axial translation of the corresponding ten-tooth selection gear 19 on its square supporting shaft 20 relative to a series of stepped teeth (not shown) on actuator drum 21 (FIGS. 4 and 5).

Each of the dials 25 (FIGS. 2, 4, 6, and 7), one for each of the selector wheels 14, is differentially adjusted in accordance with the adjustment of the corresponding selector wheel 14 to provide the visual indication of the selected postage value in the corresponding sight opening 15. The dials 25 are coaxially and rotatably mounted on shaft 26 supported at its respective ends in brackets 27 and 28 secured within the framework of the machine. On the peripheral surface of the units of cents and tens of cents dials 25 are the numerals "0" and "1" to "9," while on the peripheral surface of the dollar dial 25 (the left-hand dial in FIG. 4) the numerals "1" to "9" appear, together with a filigree designation representative of the "0" position of the dial.

The selector wheels 14 are coaxially and rotatably mounted in equally spaced relationship on the shaft 29 supported at its respective ends in flanges 30 and 31 of U-shaped bracket 32 secured within the framework of the meter unit. As each selector wheel 14 is manually rotated in a clockwise direction from the "0" representative position shown in FIGS. 6 and 7, associated rack slide 33 is moved to the right thereby imparting a similar angular rotation to the corresponding dial 25. For this purpose, the teeth of the left-hand rack portion 34 of each slide 33 mesh with the teeth of the gears 35 which are secured on the wheels 14 concentric therewith. Similarly, the teeth of the right-hand rack portion 36 of each slide 33 mesh with the gears 37 carried by the corresponding dials 25. Notches are provided in the peripheral surface of the integrally formed hub 38 of each of the selector wheels 14 and cooperate with the tooth on the associated spring-urged detent pawl 39 to resiliently retain each of the wheels 14 and corresponding dials 25 in each angularly rotated position thereof. Although there are twelve such detent notches in the hub 38 of each of the wheels 14, only ten of these notches are utilized since the rotation of the wheels in either direction is limited by the engagement of one end or the other of the left-hand rack portion 34 with the corresponding abutment 40 or 41 of U-shaped bracket 32.

As the selector wheels 14 are rotated clockwise from the "0" representative position shown in FIGS. 6 and 7 to effect a visual indication of the digits of a desired postage value, the corresponding selection slides 45 (FIGS. 4 and 6) are differentially adjusted in accordance with the incremental rotation of the wheels 14 to enable the registration of the selected value in the ascending register 46 and the descending register 47 and to adjust the numeral type wheels 17 in the print-head 18. A series of similar parallel elongated slots 48 (FIG. 6) is provided in each selection slide 45 for engagement with respective rods 49 which serve to guide the slide in its endwise movement. Each rod 49 is passed through the corresponding aligned slots 48, and is secured at its ends in the legs or side members 50 and 51 of the U-shaped bracket 52 suitably secured in the framework of the meter unit (FIGS. 4 and 6).

To control the endwise adjustment of the selection slides 45, an upwardly extended portion 53 of each slide is provided with rack teeth along its upper edge which are enmeshed with the gear 35 of the corresponding selector wheel 14. Upon endwise adjustment of each slide 45 to the left from the "0" or normally inactive position shown in FIG. 6, the associated ten-tooth selection gear 19 (FIG. 5) is moved laterally on its square shaft 20 to be differentially positioned relative to the stepped teeth on the actuator drum 21 secured on shaft 22. Thereafter, upon each cyclic rotation of the actuator drum 21, the selected value is subtracted from the prepaid postage value in the descending register 47, preset by an authorized postal official, and is also accumulated in the ascending register 46 of the meter unit 12.

To this end, each of the square shafts 20 carries a ten-tooth gear 54, similar to the ten-tooth selection gears 19, nonrotatably mounted upon the shafts. Each of the ten-tooth gears 54 is enmeshed with a corresponding idler gear 55 rotatably mounted on actuator shaft 22. Each idler gear 55 is, in turn, enmeshed with a pair of ten-tooth gears 56 and 57 associated, respectively, with registers 46 and 47 to effect the registration of the selected value in a well-known manner in each of the registers.

In the normally inactive, or full cycle, position of the actuator 21, each of the square shafts 20 is centralized and locked against rotation. In order to lock the square shafts 20 against rotation, a ten-tooth star wheel 62 (FIG. 4) is secured on each shaft near the end thereof and adjacent the inner surface of the front frame plate member 63 (FIG. 2). A series of radially disposed pins 64, substantially rectangular in cross-section, are slidably mounted within an arcuate retainer 65 secured on the inner face of the front frame plate member 63. The outer end of each of the radially disposed pins 64 is substantially V-shaped and is adapted for engagement in a notch in the associated star wheel 62 in each angularly rotated position of the wheel. The inner end of each pin 64 is also V-shaped and is adapted for engagement by the peripheral surface 66 of disk 67 keyed on actuator shaft 22. The radius of the peripheral surface 66 of disk 67 is only slightly less than that of the inner surface of the arcuate retainer 65 so that, in the full-cycle position of the parts as seen in FIG. 4, the pins 64 are held in their outwardly moved position with the outer noses thereof engaged in a notch of the corresponding star wheels 62, thereby locking the square shafts 20 against rotation. In order to enable rotation of the square shafts, the disk 67 is provided with a recess or depression, 68 in the periphery thereof, which is of a depth sufficient to permit pins 64 to be moved inwardly upon rotation of the associated star wheels 62, and is of a length sufficient to permit a complete rotation of each star wheel.

In the initial portion of each cycle of meter operation, the leading end 69 of the recess 68 in the periphery of the disk 67 is rotated counter-clockwise (FIG. 4) to a position beyond the end of the pin 64 associated with the uppermost, or first, star wheel 62 on shaft 20. A possible nine incremental angular rotation may then be imparted to the corresponding shaft 20 when the associated star wheel 62 becomes effective to cam the corresponding pin 64 inwardly. Similarly, upon further counter-clockwise rotation of actuator 21 and disk 67, the leading end 69 of the recess 68 moves to a position beyond the end of the middle or second pin 64 in order to permit angular rotation of the corresponding square shaft 20. As the actuator drum 21 and disk 67 continue in their cyclic rotation, the lowermost pin 64 is released, thereby enabling rotation of the corresponding square shaft 20. Upon termination of the rotation permitted the top or uppermost shaft 20, the inclined trailing end 70 of the recess 68 becomes effective to cam the corresponding pin 64 outwardly to engage its outer end in a notch of the associated star wheel 62 in any selectively rotated position thereof. Similarly, the inclined end 70 of the recess 68 becomes effective successively to lock each of the other square shafts 20 in their selectively rotated positions. Hence, each of the shafts 20 is released seriatim to receive increments of rotation and, immediately following rotation imparted thereto, become locked and remain in their locked condition to the end of the meter cycle.

As stated hereinbefore, the selective adjustment of the selector wheels 14 not only conditions the meter for the registration of the selected value in registers 46 and 47, but is also effective to adjust, accordingly, the corresponding type wheels 17 in the print-head 18 (FIGS. 9 and 14). The selection slides 45 (FIGS. 4 and 6) are ordinally arranged in accordance with the ordinal arrangement of the selector wheels 14 and are positioned one adjacent the other from right to left (FIG. 4) with the right-hand slide being the units of cents slide. The type wheel adjusting slides 75 are ordinally arranged from left to right in FIG. 4, one adjacent the other, with the units of cents slide being the left-hand slide. Each of the slides 75 is provided with a series of slots similar to the slots 48 in the selection slides 45 and is similarly mounted for endwise movement on rods 49. At its rightmost end, each of the type wheel setting slides 75 (FIGS. 4 and 6) is provided with the upwardly extended portion 76 of a graduated length, the height of the extended portion 76 of the units of cents setting slide 75 being the highest while that of each adjacent slide 75 is shorter by equal increments. Similarly, each of the selection slides 45 is provided with an upward extension 77, the end portion of which projects laterally for engagement in a suitable notch in the top edge surface of the extended portion 76 of the corresponding ordinal type wheel setting slide 75. Thus, it becomes apparent that each increment of movement of each selection slide 45 will effect a like increment of movement of the corresponding type wheel setting slide 75.

The lower extremity of the depending portion 78 of each type wheel setting slide 75 (FIG. 4) extends angularly downwardly, forming a rack, the teeth of which extend laterally in a plane parallel to the plane of movement of the slides meshing with the corresponding gears 80. The gears 80 are coaxially mounted for rotation on shaft 81 supported in parallel flanges 82 and 83 of bracket 84 secured on auxiliary frame member (FIGS. 4, 9, 10 and 11) and form one set of a pendant train of three sets of gears. Each gear of the set of similar ten-tooth gears indicated at 89 is meshed with the corresponding gear of the set of gears 80 and is also meshed with a corresponding gear of the set of similar ten-tooth gears indicated at 90. The sets of gears 89 and 90 are rotatably mounted on respective shafts 91 and 92 and are spaced on their respective shafts in accordance with the spacing between gears 80 on shaft 81. Each of the shafts 91 and 92 is axially parallel with the other, and with shaft 81, and is secured at its respective ends in legs 93 and 94 of bail 95 rockable about the axis of the shaft 81.

Referring to FIGS. 4, 9, 10, 11 and 14, in the normal full-cycle position of the meter print-head 18, spring 100, supported at its one end on the ear of the bracket 101 secured on meter base plate 102 and at its other end on the right-angle extension 103 of bracket 104 secured on the web portion of bail 95, serves to urge bail 95 downwardly from the position shown in FIG. 9 to the position shown in FIG. 11. In this active position of the bail 95 (FIG. 11), an adjustment of the selection slides 45 is effective to impart rotation to the series of gears 80, 89 and 90, effecting a like adjustment of the numeral type wheels 17 in the print-head 18. The type wheels 17 are rotatably mounted on shaft 108 secured at its ends, respectively, in legs 109 and 110 of U-shaped type wheel carrier 111. Suitable aligned openings are provided in the web portion of the U-shaped bracket 111, cover plate 112 and the indicia die plate 113, within which type wheels 17 are rotatable. The size of each of the apertures is sufficient only to permit rotation of the numeral type wheels therein and to permit the positioning of the wheels in the face of the indicia die plate 113 so that the type thereon is flush with the printing surface of the indicia die. A bar (not shown) extends across the aperture in the indicia die plate 113 between the tens of cents and units of dollars numeral type wheel 17, upon which a decimal point is embossed and is positioned flush with the indicia die and numeral type wheel printing surface.

A ten-tooth gear 114 (FIG. 9) is secured on one side of each of the type wheels 17 concentric therewith and enmeshed with a corresponding twenty-tooth gear 115. The gears 115 are rotatably mounted in ordinal spaced relationship on shaft 116 which is axially parallel with shaft 108 and is secured at its respective ends in the legs 109 and 110 of the U-shapel type wheel carrier 111. The U-shaped carrier 111 is suitably secured between parallel disks or print-head end plates 117 and 118, disk 117 being provided with an aperture within which a portion of the teeth of the twenty-tooth gears 115 rotate. Thus, it can be seen that in what is to be considered the full-cycle position of the print-head 18 (FIG. 9), the spring 100 urges bail 95 into the active position shown in FIG. 11, moving the set of gears 90 into the aperture in disk 117 for meshing engagement with the corresponding gears 115. Thereafter, for each incremental rotation of a selector wheel 14, the corresponding gear 80 will impart a similar increment of rotation to the type wheel 17 controlled thereby, moving the desired type character thereon into printing position. Upon cyclic rotation of the print-head 18, an impression may then be taken therefrom in a manner to be hereinafter described.

Means are provided for resiliently retaining the numeral type wheels 17 in the desired adjusted printing position. For this purpose, each ten-tooth gear 114 has a detent pawl, or lever, 122 associated therewith and rockably mounted on a shaft 123 secured at its respective ends in legs 109 and 110 of U-shaped type wheel carrier 111 (FIG. 9). Each detent lever 122 is provided at its upper free end with a V-shaped nose which is resiliently urged by the associated spring 124 into a position between two adjacent teeth of the associated gear 114 in each adjusted position of the corresponding type wheel. During each cyclic rotation of the print-head 18, detent pawls 122 are locked in the active position shown in FIG. 9. For this purpose, a bar 125 of a bail, generally indicated at 126, extends transversely of the type wheel carrier 111 and is supported at its ends by arms 127 and 128, respectively, pivotally mounted on shaft 129 supported at each end in respective legs 109 and 110 of the type wheel carrier. Each of two similar springs 130 normally urge bails 126 clockwise (FIG. 9) to a position wherein the leading edge of each bail arm 127 and 128 engages the inner surface of disk 117, the leading edge of the bail arm 127 extending across the lengthwise dimension of a rectangular slot 131 in disk 117. In the full-cycle position of the print-head 18, and with the bail 95 in the normally active position shown in FIG. 11, the tooth-like projection 132 on the transverse portion of the bail 95 enters aperture 131 to engage the leading edge of the bail arm 127 thereby rocking bail 126 counter-clockwise against the urgency of the springs 130, as seen in FIG. 9. In this position of the bail 126, the dentent levers 122 are free to rock thereby enabling a selective adjustment of the corersponding numeral type wheels 17. However, when the bail 95 is rocked clockwise to its inactive position (FIG. 9) to enable the cyclic rotation of the print-head 18, as will be described hereinafter, springs 130 urge bail 126 in a clockwise direction. At this time, the bar 125 of bail 126 moves into engagement with the inclined surface of the nose of the upright extension 133 of each of detent levers 122, thereby preventing rocking movement of the levers 122, or rotation of the numeral type wheels 17.

Inasmuch as the postage metering mechanisms described above are conventional and form no part of the present invention, only a brief description thereof has been given. For a more complete disclosure, reference is to be had to the afore-mentioned patent, No. 3,107,854.

Means become effective to lock the set of gears 90 against rotation to prevent further manipulation of selector wheels 14 when bail 95 is rocked clockwise from the active position shown in FIG. 11 to the inactive position shown in FIG. 9, at which time, the set of gears 90 are disengaged from the corresponding gears 115 and the type wheels 17 are locked against rotation. For this purpose, a bail 138 is disposed between the legs 93 and 94 of bail 95 (FIG. 10), with the lower offset leg 139 and the upper leg 140 of the bail 138 serving to rockably support the bail on shaft 141. The shaft 141 is disposed axially parallel to shaft 92, having its lower end supported in the angularly formed portion of leg 94 of bail 95 and its upper reduced diametral end portion extending through a suitable aperture in leg 93 of the bail 95 to provide a pivotal mounting for a lever 142. The bar 143 (FIGS. 9, 10, and 11) of bail 138 is of a length sufficient to span the faces of the set of gears 90, and its lower knife-like edge is adapted for engagement between adjacent teeth of the gears 90 upon clockwise rocking movement of the bail from the position shown in FIG. 11. Upon movement of bail 95 to the inactive position shown in FIG. 9 for a cycle of operation of print-head 18, a torsion spring 144 surrounding shaft 141 (FIGS. 10 and 11) serves to urge the knife-like edge of the bar 143 into engagement with the set of gears 90, thereby locking the train of gears 80, 89, and 90 as well as selector wheels 14 againt rotation. During this clockwise rocking movement of the bail 138 (FIG. 11), the upper portion of the arcuately formed extension 145 of bail arm 140 moves within the confines of the rectangular slot 146 of auxiliary frame member 85. In the full-cycle position of the print-head 18 and upon return of bail 95 to the active position shown in FIG. 11, bail 138 is rocked counter-clockwise under the control of the lever 142 as will be hereinafter described, to disengage the bar 143 from the set of gears 90 to again enable the adjustment of the type wheels 17 by the corresponding selector wheels 14.

Upon counter-clockwise rocking movement of the bail 138 to its inactive position (FIG. 11), a shoulder 147 in the arcuate member 145 of the bail arm 140 engages the inner surface of the auxiliary frame member 85 to prevent the rocking of the bail 95 to its inactive position under certain conditions. If one or more of the gears of the set of gears 90 is angularly displaced relative to the engaging edge of the bail bar 143 due to a partial angular adjustment of one or more selector wheels 14, the top surface of an adjacent tooth of the gear or gears 90 will be in the arcuate path of travel of the bail bar 143. Thus, bail 95 cannot be rocked to its inactive position. In order to prevent the rocking of the bail 95 in the condition just described, the distance between the engaging edge of the bail bar 143, and the top surface of the adjacent tooth or teeth of the gears 90, is sufficiently less than the length of the shoulder 147 in the extension 145, so that upon engagement of the bar 143 with the top of the adjacent tooth or teeth of the gears 90, the shoulder 147 will not become disengaged from the frame member 85.

Referring to FIGS. 13, 14, 15 and 16, the print-head 18 also carries, in addition to the postage indicia die plate 113, and numeral type wheels 17, a town circle die plate 150, a slogan, or advertisement, die plate 151 and month, day and year type wheels 152, 153 and 154, respectively. With each cyclic rotation of the print-head 18, the town circle plate 150 becomes effective to cause an impression of the city and state to be made on mail matter with the date centered therein. The dater type wheels 152, 153, and 154 are progressively larger in diameter with the type face of each arcuately formed to conform to the printing curvature of the town circle die plate 150. Each of the type wheels 152, the two type wheels 153, and type wheel 154 is provided with internal gear teeth 155, similar to the gear teeth shown in FIG. 13, the internal gearing for the four type wheels having the same pitch diameter. The internal diameter of the internal gearing of each type wheel, i.e., the distance between the tops of diametrically opposed teeth, is slightly greater than the diameter of a crescent-shaped pivot block 156 about which the type wheels are rotatable. The pivot block 156 is secured against the surface of the leg 110 of U-shaped carrier 111 by any suitable means, such as riveting, as indicated at 157 in FIG. 14. Each of the dater type wheels 152, 153, and 154 is resiliently retained in each angularly adjusted position thereof, the month type wheel 152 and the units day type wheel 153 being so retained by similar spring and ball detents 158 radially disposed in pivot block 156 (FIGS. 13 and 14). The tens day type wheel 153 and year type wheel 154 are similarly retained in each angularly rotated position thereof by spring and ball detents 159, similar to detents 158 chordally disposed in the pivot block 156 (FIG. 13). To be effective, the ball of each of the detents 158 and 159 engages between two adjacent teeth of the associated type wheel. Inasmuch as the year type wheel 154 is to be adjusted but once a year, such adjustment is made by means of a stylus. However, the month type wheel 152, as well as the tens day and units day type wheels 153, may be selectively controlled by the operator upon manipulation of the dater selection mechanism, generally indicated at 164 in FIG. 15.

For this purpose, the dater selection mechanism 164 comprises a month selector disk 165, the tens day selector disk 166 and the units day selector disk 167 (FIGS. 14 and 15). Each of the selector disks 165, 166 and 167 is provided with internal gearing of similar pitch diameter such as that indicated at 168 in FIG. 15. The internal diameter of the selector disks is slightly greater than the diameter of the crescent-shaped pivot block 169 about which the disks are rotatable. The pivot block 169 is secured on the leg 109 of U-shaped carrier 111 by any suitable means, such as riveting as indicated at 170, and extends upwardly through a circular aperture in the auxiliary disk supporting plate 171 secured in print-head 18 between the print-head end frames 117 and 118 (FIG. 2). Inasmuch as the dater selection mechanism 164 is accessible to an operator in the full-cycle position of the print-head 18, as shown in FIG. 2, through a suitable opening provided in the cover (not shown), the disks may be selectively adjusted by means of a stylus. For such control, each of the disks 165, 166 and 167 is provided with a similar series of equiangularly spaced notches 172, 173 and 174, respectively, in the periphery thereof.

The type wheel 152 and each of the type wheels 153 may be individually adjusted by the selective adjustment of the corresponding selector disks 165, 166 or 167. For this purpose, there are three similar six-tooth gears 178, 179 and 180 associated with the dater type wheels having a stacked relationship within the concave area 181 of the pivot block 156 (FIG. 13). Gear 178 is enmeshed with the internal gearing of month type wheel 152, while gear 179 is enmeshed with the tens day type wheel 153 and gear 180 is enmeshed with the units day type wheel 153. Similarly, there are three identical six-tooth gears 182, 183 and 184 associated with the selector mechanism 164, likewise disposed in a stacked relationship within the concave area 185 of pivot block 169 (FIGS. 14 and 15). The gear 182 is enmeshed with the internal gearing of month selector disk 165, gear 183 with the internal gearing of tens day selector disk 166 and gear 184 with the internal gearing of the units day selector disk 167. Gear 182 associated with the month selector disk 165 is secured on the half-round end portion of one end of shaft 186 (FIGS. 14, 15 and 16) which, at its other end, carries gear 178 secured on the half-round portion thereof.

Shaft 186 extends through and is rotatably supported in the quill shaft, generally indicated at 187 (FIG. 14), comprising an upper shaft section 188 and a lower shaft section 189 (FIG. 16) connected together for rotation by the engagement of diametrically opposed extensions 190 of the shaft section 188 with diametrically opposed slots 191 in shaft section 189. The upper section 188 of the quill shaft 187 carries gear 184 integral therewith and cooperating with tens day selector disk 166, while the lower section 189 of the quill shaft 187 carries gear 179 integrally formed thereon and enmeshed with the teeth of the internal gear of tens day type wheel 153. Thus, each increment of angular rotation of the tens day selector disk 166 imparts a like rotation to the tens day type wheel 153. Quill shafting 187 is rotatably supported within a quill shaft, generally indicated at 192, comprising upper shaft section 193 and lower shaft section 194 (FIG. 16) which are connected similarly to sections 188 and 189 of the quill shaft 187. Section 193 of the quill shaft 192 carries the gear 187 integral therewith and associated with the units day selector disk 167, while section 194 of the quill shaft 192 carries gear 180 integrally formed thereon and associated with the units day type wheel 153. Thus, upon rotation of the selector disk 167, a like rotation is imparted to the corresponding type wheel 153, the quill shaft 192 being journalled in each of the legs 109 and 110 of the U-shaped carrier 111. A portion of gear 184 on quill shaft 192 normally rides on the surface of the auxiliary disk supporting plate 171 and because of this, together with the use of circular end plates 195 and 196 (FIGS. 13, 14 and 15) shaft 186, quill shafts 187 and 192, and the respective gears carried thereby, are retained in the relative positions shown. Circular end plate 195 is provided with two apertures, one of which the hub of gear 182 is engaged in, and the other of which is engaged by, a projection 197 of pivot block 169, the projection 197 having an annular groove therein to receive a clip 198 which is effective to retain end plate 195 in position on block 169. Similarly, end plate 196 is provided with two apertures, one engaging over the hub of the gear 178 (FIGS. 13 and 14) and the other engaging over the projection 199 of pivot block 156, the plate being held in place on the pivot block by means of a clip engaging in an annular groove in the projection 199.

Referring to FIGS. 14, 17 and 18, the slogan, or ad, plate 151 may be selectively controlled for movement to print or nonprint position. To control the movement of the slogan plate 151, a manipulative member in the form of a sector 204 is positioned adjacent the end disk 118 of print-head 18, and is pivotally supported thereon by means of a shoulder screw 205. An ear 206 of the sector 204 extends upwardly through a suitable notch in the leg 109 of U-shaped carrier 111 and a notch in the disk supporting plate 171, having its end portion formed angularly inwardly into the area adjacent the dater selection mechanism 164 for manipulation by an operator. Sector 204 carries an inverted L-shaped lateral extension 207 arcuately conforming to the curvature of the inner surface of the plate 208 secured between end disks 117 and 118 of the print-head 18. Plate 208 as well as U-shaped type wheel carrier 111 and selection disk supporting plate 171 are securely held in position, in a well-known manner, between each of end disks 117 and 118 of print-head 18 by means of a rod 227, each end of which is tapped to receive each of similar screws 228.

At its one end, a flexible offset bracket, or leaf spring 209 is secured to the leg of the L-shaped extension 207 by means of a screw 210, a slot 211 being provided in the plate 208 to accommodate the head of the screw 210 during the movement of the sector 204. At its other end, the flexible bar 209 carries a resilient strip, or leaf spring, 212 disposed transversely thereof, and at right angles thereto, with each end lying against the inner surface of the curved plate 208 for sliding movement thereon. The bar 212 is secured on bracket 209 by means of a screw 213, which also serves to secure the slogan plate 151 to the bar 209 (FIGS. 14, 17 and 18).

Sector 204 is movably retained in either of two positions, print or nonprint, by the engagement of one or the other of apertures 214 and 215 with the semispherical node 216 on print-head end disk 118. For the nonprint position of the slogan plate 151, sector 204 is rocked counter-clockwise from the position shown in FIG. 18 to engage aperture 215 with the node 216. At this time, the slogan plate 151 rests against the peripheral surface of the plate 208, disposed between each of the guide rails 217 and 218 (FIG. 17). As the sector 204 is rocked clockwise to the position shown in FIG. 18, the chamfered upper, or leading, edge of the slogan plate 151 moves up the inclined, or camming, surfaces 222 to a position of rest on top of the bars 223. At the same time, each of the laterally extending lugs 224 of the slogan plate 151, by virtue of their chamfered leading edge, move up the inclined end surfaces 225 of guide rails 217 and 218 to a position of rest in the respective notches 226. In this manner, the slogan plate 151 is raised to its printing position wherein the printing surface of the plate is in the printing plane with that of the town circle die as well as with that of the indicia and numeral type wheels.

In operation, print-head 18 and actuator shaft 22 are driven by means of an electric motor and gear reduction unit of a well-known type, generally indicated at 233 (FIGS. 2 and 9) secured as an integral unit on auxiliary frame member 85 by means of spacer studs 234 and screws 235 (FIGS. 9 and 10). An extended diametric rib is formed on the end of the motor-driven stub shaft 236 for engagement in a corresponding slot 237 in one end of one shaft extension 238 secured on, and concentric with, disk 117 of print-head 18 (FIG. 17). Shaft extension 238 and the shaft extension 239, which extension is secured on print-head disk 118 coaxial with shaft 238, serve to support print-head 18 within the framework of the meter, the shafts being journalled, respectively, in auxiliary frame plate 85 and frame plate 63.

As described in the above-mentioned Patent No. 3,107,854, a synchronous rotation is imparted to the print-head and actuator mechanism, that is, for each cycle of rotation of the print-head 18, the actuator shaft 22 receives a like rotation. For this purpose, shaft 239, on its outer end, carries a toothed pulley 240 (FIG. 8) and a similar toothed pulley 241 is secured on the outer end of the actuator shaft 22, the pulleys 240 and 241 being drivingly connected by means of timing belt 242.

If, for any reason, the belt 242 should be broken or any portion of the teeth stripped therefrom, either during or following the digitation phase of a machine cycle of operation, means become effective to prevent a subsequent operation of the meter. The meter then requires the attention of authorized personnel to effect replacement of the damaged belt 242. It is to be noted that, conventionally, the digitation phase of a meter cycle of operation is completed in approximately 210° of the cycle, followed by the printing of the indicia and the operation of the tens-transfer mechanism during the latter part of the cycle. If the belt 242 becomes damaged at any time after the initiation of the cycle of operation and before 200° in the cycle, the digitation phase may or may not have been completed, and an impression will not have been taken from the indicia die plate 113. Thereafter, or following approximately 210° of the cyclic rotation of timing pulley 240 (FIG. 8), the pin 246 on the flange of the timing pulley 240 will engage the end of the angularly downwardly extending arm 247 of the three-arm bellcrank 248 rockably mounted on stud 249 secured on meter frame plate 63. Thus, further rotation of the timing pulley 240 is precluded and the indicia die plate 113 will not have been moved into the opening 250 (FIG. 4) in the meter base 102, so that an impression will not have been taken. Inasmuch as the indicia print-head 18 is locked in an intermediate cyclic position, the amount of postage indicated in the selector register dials 25 is locked in the selection mechanism by virtue of the fact that the set of gears 90 are locked against rotation by the engagement of the bar 143 of bail 138 therewith (FIGS. 9 and 10).

After approximately 200° of cyclic meter operation, the pin 251 on toothed pulley 241 (FIG. 8) engages the surface of the lateral extension 252 of link 253, to move the link to the left. Adjacent its one end, link 253 is supported for reciprocative movement by the engagement of a slot therein with a pin 254 on meter frame member 63, and at its other end is pivotally connected at 255 to the upwardly extended arm 256 of three-arm bellcrank 248. As link 253 is moved to the left (FIG. 8) to rock bellcrank 248 counter-clockwise against the urgency of spring 259, the hook end portion of the third arm 257 of the three-arm bellcrank 248 is rocked into the rotational plane of pin 246 on toothed pulley 240. With the counter-clockwise rocking of the bellcrank 248, the end of the arm 247 will be rocked out of the rotational plane of the pin 246 so that rotation of toothed pulleys 240 and 241 will be unrestricted. However, in the event the belt 242 becomes damaged during the ensuing 70° rotation of the pulleys 240 and 241 or up to 270° in the cycle, rotation of the toothed pulley 241 will terminate while the rotation of the toothed pulley 240 will continue until pin 246 thereon engages the hook end of arm 257, terminating the rotation of the pulley 240 in the full-cycle position thereof. Under this condition, the postage impression will have been taken and the digitation phase of the cycle will have been completed, so that the amount of postage registered in the dials 25 of the selector register will have been subtracted out of the descending register 47 (FIG. 4) and accumulated in the ascending register 46. However, the tens-transfer phase of the operation may or may not have been completed. After 270° in the cycle, as pin 258 on toothed pulley 241 moves out of engagement with the surface of the extension 252 of link 253, the postage indicia will have been printed and the digitation and tens-transfer phase of the operation will have been completed.

Following the damaging of the belt 242, the cover of the meter must be removed by someone in authority to do so and the damaged belt replaced by a new belt. In the first instance described above and after the cover has been removed, the indicia print-head 18 is rotated counter-clockwise in FIG. 4 to its full-cycle position and the actuator shaft 22 and, therefore, actuator drum 21 are likewise rotated in a counter-clockwise direction, as viewed in FIG. 4, to the full-cycle position followed by the replacement of the belt 242. It will be remembered that under the first condition described, the amount of postage indicated in the register dials 25 remains locked in selection. Consequently, as the actuator drum 21 is rotated to its full-cycle position, the amount of postage indicated in the register dials 25 will be entered in the descending register 47 and the ascending register 46, followed by the tens-transfer phase in each register to complete the operation. In the second instance, even though the indicia print-head 18 is restored to its full-cycle position, wherein it becomes locked, and the selection slides are free to be adjustably moved by the wheels 14 of the selector mechanism, the digitation phase of the cycle of operation will have been completed and the value in the register dials 25 will have been entered into the registers 46 and 47. However, the actuator 21 must be restored counter-clockwise, as viewed in FIG. 4, to its full-cycle position before installation of the new belt 242. During the restoration of the actuator 21 to its full-cycle position, the tens-transfer phase of the operation will be completed. In order to prevent backlash of the toothed pulley 240 upon engagement of pin 246 with the end of the arm 247 of bellcrank 248, the nose of the pawl 260 engages between two adjacent teeth of the pulley 240 immediately upon termination of rotation of the pulley. Pawl 260 is pivotally mounted on stud 249 and is normally urged in a counter-clockwise direction by means of spring 261 to the position shown in FIG. 8, wherein the lower end of slot 262 in pawl 260 engages pin 263 on meter frame member 63. During each cyclic rotation of the toothed pulley 240, the nose of the pawl 260 ratchets over the teeth of the pulley, coming to rest between two adjacent teeth upon termination of the rotation of the pulley, thereby preventing rebound or contrarotation.

As is well-known in postage meters of the type disclosed in the afore-mentioned patent, No. 3,107,854, the dials 264 of the descending register 47 (FIG. 4) are set by a postal official to represent the amount of prepaid postage purchased by a user of the meter. The dials 264 of the descending register 47, in the embodiment shown, i.e., a three-bank meter, may be adjusted to represent values of up to $9,999.99, the maximum capacity of the register. Usually the postage would be purchased in increments of $10.00, $100.00 or $1,000.00. Each postage value represented by the dials 25 of the selection mechanism is deducted from the value set in the descending register 47 with each cycle of machine operation until the tenths, hundredths and thousandths orders of the register reach "0" registration, at which time subsequent use of the meter is precluded. To this end, a shaft 265 (FIGS. 4 and 8) extends transversely of the meter axially parallel with the descending register 47 and is journalled in frame plates 63 and 266. Each of three U-shaped arms, similar to arm 267 in FIG. 4, is secured in ordinal spaced relationship on shaft 265. The arms 267 are associated for cooperation with a ten-tooth gear 268 carried by each of the corresponding three highest ordinal dials 264 of register 47. An arm 269 secured on the outer extended end of shaft 265 is provided with a laterally projecting ear 270 at its free end, and is normally urged counter-clockwise (FIG. 8) by a spring 271. If any one of the three highest order register dials 264, from the lowest ordinal dial of the three to the highest ordinal dial, is adjusted to represent a value other than "0" the V-shaped nose of the associated arm 267 rides on the peripheral surface of the web portion 272 of the dial to retain arm 269 in the extreme clockwise rocked position shown in FIG. 8. However, during the tens-transfer phase of a cycle of machine operation when each of these three highest order dials 264 is moved to its "0" registering position, spring 271 urges arm 269 downwardly to engage the V-shaped nose of each arm 267 in the corresponding tooth of the gear 268 carried by the associated register dial 264, thereby preventing a subsequent registration of a value in the descending register 47. It will be remembered that immediately following the tens-transfer phase of meter operation, pins 251 and 258 on toothed pulley 241 (FIG. 8) move link 253 to the left, rocking bellcrank 248 counter-clockwise wherein pin 246 on toothed pulley 240 engages the hook end of the arm 257. At this time, the ear 270 of arm 269 is rocked to a position wherein the edge of the ear is in contact with the end surface 273 of the angularly formed projection of arm 256 of bellcrank 248, thereby locking register 47 and preventing clockwise return movement of bellcrank 248 to the full-cycle position shown in FIG. 8. Thus, it can be seen that toothed pulley 240 is thereby locked against subsequent rotation.

Normally meter unit 12 is secured on base portion 10 for operation of the meter. However, the meter unit is detachable from the base for transportation to a Post Office for adjustment of the descending register 47 by authorized personnel to represent purchased prepaid postage. Secured on the bottom of the meter base 102 are three similar pins 278 (FIGS. 19 and 20) having enlarged heads adapted to enter the circular portion of the pear-shaped openings 279 in the sole, or mounting, plate 280 secured by means of screws 281 on bosses formed on the cover plate 282 of base portion 10. The heads of the pins 278 are spaced from the bottom of meter base plate 102 a distance slightly greater than the thickness of the sole, or mounting, plate 280, so that following the entry of the pins 278 in the apertures 279 and upon movement of the meter unit 12 to the left as viewed in FIG. 19, the pins 278 engage in the slotted portions of the corresponding apertures 279 to secure the meter unit on the base portion 10.

As the meter unit 12 is placed upon the sole plate 280 and the pins 278 on the meter base 102 enter the corresponding apertures 279, the upper right-hand pin 278 (FIG. 19) rocks the flexible strap 283 downwardly. The flexible strap 283 is secured at its one end to the lower surface of the sole plate 280 and immediately following movement of the meter unit 12 to the left, as viewed in FIGS. 19 and 20, the strap 283 returns to its initial position behind the head of the associated pin 278, thereby detachably securing the meter unit in place on the base portion 10. The resilient strap 283 extends outwardly and, at its free end, carries a suitable finger grip 284 manipulative by an operator. As the finger grip 284 is depressed to move the free end of the strap 283 downwardly, the edge of the strap is moved out of engagement with the head of the associated pin 278, thereby freeing the meter unit for removal from the base portion 10.

As the meter unit 12 is moved into its operative position upon base portion 10, the indicia print-head 18 is positioned above and slightly to the right (FIG. 4) of the vertical center line of a platen 288. The platen 288 is rotatably mounted on a shaft 289 supported at its respective ends in the extended end of each of flanges 290 and 291 of a channel carrier, generally indicated at 292 (FIGS. 4, 21 and 22). At its other end each of flanges 290 and 291 is supported for rocking movement upon a shaft 293 secured at its ends in depending bosses 294 integrally formed on the lower surface of the cover plate 282 of base portion 10. Shaft 289, carrying platen 288, is axially parallel to shaft 293 and is maintained by carrier 292 in an axially parallel relationship to print-head shaft 239. The platen 288 is disposed within a suitable aperture 295 in the top of the cover plate 282 of the base portion 10, the aperture 295 being slightly greater dimensionally than the length and the diameter of the platen 288.

Normally, platen roller 288 is maintained in the inactive position shown in FIGS. 2, 4, 8 and 21, wherein the top of the roller is slightly above the top of the cover plate 282 in spaced relationship to the print-head 18. Upon initiation of a machine cycle of operation and during the initial 180° of rotation of the print-head 18, the platen roller 288 is moved upwardly to its active position. For this purpose, a right angularly formed lever 301 is mounted for rocking movement on a shaft 302 extending transversely of the meter unit and supported at its respective ends in frame members 63 and 266. A relatively strong spring 303, secured at its one end on a stud on lever 301 and at its other end on a spring stud secured on auxiliary frame member 85, serves to maintain a roller 304 in engagement with an accelerated motion cam 305 secured on the print-head shaft extension 238. At its lower end, the depending leg 306 of lever 301 carries a pin 307 engaged in a horizontally disposed bifurcation or open end slot 308 in the upwardly extended portion 309 of one arm 310 of a bail, generally indicated at 311. The other arm 312 of bail 311 is parallel to arm 310 and is integrally connected therewith by means of web portion 313. Each of the arms 310 and 312 of bail 311 is coaxially mounted for rocking movement on shaft 293. In the full-cycle position of the print-head 18, the spring 303 maintains roller 304 on lever 301 in engagement with the lowest point of contact on the periphery of the cam 305 (FIG. 21) to maintain bail 311 in the inactive position shown in FIGS. 4, 8 and 21.

Inasmuch as the shaft 238 and the cam 305 thereon, as well as lever 301, are supported within the framework of the meter unit, the extension 309 of arm 310 projects upwardly through a suitable opening 319 (FIGS. 3 and 19) in the cover plate 282 of base portion 10, so that the open end of the slot 308 is in the path of travel of pin 307 on lever 301. Thus, the engagement or disengagement of the pin 307 with slot 308 may be easily effected upon the attachment or detachment of the meter unit on the base portion 10.

In the initial 180° counter-clockwise rotation of the print-head 18 (FIGS. 4 and 21), cam 305 becomes effective to rock lever 301 clockwise, thereby imparting a clockwise rocking movement to the bail 311 about shaft 293. At the same time, bail 292 is similarly rocked clockwise about shaft 293 to move platen 288 into operative relationship with indicia print-head 18 where it remains for the balance of the cycle. Following approximately 210° in the machine cycle, a series of serrations 318, formed on the peripheral edge of each of print-head end plates, or disks, 117 and 118, move into tangential relationship to the actively positioned platen 288 to effect movement of an envelope to be postmarked to the right, as viewed in FIG. 4. The outside radius of each of the arcual series of serrations 318 is substantially that of the printing surface of the die plates on the print-head 18 and the length of each arc is equivalent to the combined arcual lengths of the indicia die plate, town circle die plate, and the slogan die plate.

Upon counter-clockwise rotation of cam 305, the movement of the platen 288 to its operative position is effected by means of a double torsion spring 320 supported on shaft 293. The tip or extremity of each of the similar angularly formed parallel extended ends 321 of torsion spring 320 is in contact with the undersurface of the web portion 322 of the channel carrier 292, supporting platen 288. In order to maintain this engagement of the extended spring ends 321 with web portion 322, the other or central U-shaped end portion 323 of the double torsion spring 320 rests on a nut adjustably engaged with the threaded portion of a post 324 secured in an upright position on the web portion 313 of the bail 311. A rod 325 is supported in flanges 290 and 291 of the channel carrier 292, having its ends extended to underlie respective arms 310 and 312 of the bail 311. The threaded adjustment of the nut on the post 324 is such that sufficient force is exerted by the torsion spring 320 to resiliently maintain rod 325 in engagement with the arms 310 and 312 of the bail 311. At the same time, sufficient resiliency is afforded the platen carrier 292 to enable a clear impression to be made by the print-head 18, regardless of the thickness of the envelope and its contents passing between the print-head 18 and the platen roller 288. Upon completion of a cycle of rotation of the print-head 18, spring 303 immediately returns cam follower roller 304 to the full-cycle position shown in FIG. 21. At the same time, the bail 311 becomes effective to restore platen carrier 292 to the inactive position shown in FIG. 4 by virtue of the overlying relationship of arms 310 and 312 of bail 311 with rod 325.

A manually operable control means is effective, upon depression thereof, to initiate each machine cycle of operation. For this purpose, a substantially L-shaped control bar 330 is provided (FIGS. 1, 2 and 9), the bar being preferably of a thermoplastic material and having one leg thereof extending lengthwise of the meter and parallel to the front wall of the meter base 102, exteriorly of the meter unit 12. The other leg of the bar 330 extends inwardly through a suitable aperture in the front wall of the meter base 102 and is secured by means of a screw 331 to an extending lug on one end of a control slide 332 supported for endwise movement in suitable notches in auxiliary frame plate 85 and meter frame plate 63. Movement of control slide 332 in either direction is limited by the engagement of shoulder 333 or 334 with auxiliary frame member 85 and is normally urged to the inactive position shown in FIG. 2 by means of a spring 335.

Depression, or movement, of control slide 332 is not possible until an envelope or other mail matter to be imprinted is moved into position to receive a postmark impression from print-head 18. In order to position an envelope, such as shown in phantom line at 336 in FIG. 2, for a postmark impression, a longitudinal edge of the envelope, with the face up, is moved along a guide rail 337, integrally formed at right angles to the cover plate 282 of base portion 10, until the leading edge of the envelope contacts the vertical edge of an upright arm 338 (FIGS. 1, 2 and 8) formed at right angles to an ejector slide 339, which will be described hereinafter. As the envelope 336 is moved to this position, the leading edge also engages the angular upwardly extended portion 342 of a substantially horizontally disposed arm 343 of a bail, generally indicated at 344 (FIGS. 2, 8 and 21). The other arm 345 of bail 344 is connected to arm 343 by means of a bar 346 and extends upwardly through a slotted extension of opening 319 (FIG. 19) in cover plate 282 of base portion 10. The bail 344 is supported for rocking movement upon a transverse shaft 347 secured at its ends in suitable bosses 348 integrally formed on the lower surface of cover plate 282. Normally, a relatively light spring 349 urges bail 344 counter-clockwise to the position shown in FIG. 8, wherein the left-hand edge of the arm 345 engages the end wall of the slot in which it is disposed. In this position of the bail 344, the upper end portion of arm 345 lies in the path of movement of an L-shaped depending lug 350 of control slide 332 (FIGS. 2 and 8), thereby preventing the movement of the control slide to its active position. The inclination of the left-hand edge of the extended end 342 of arm 343 (FIG. 8) is such that upon engagement by the leading edge of an envelope, bail 344 is rocked clockwise to the position shown in phantom line in FIG. 3. Hence, arm 345 is out of the path of movement of the lug 350, thereby enabling movement of control slide 332 to its active position. Following the rocking of the bail 344 clockwise to its inactive position and upon depression of the control bar 330, restoration of the bail 344 prematurely to its normal active position is precluded by the engagement of the upper end portion of the arm 345 with the horizontal extension of the L-shaped lug 350.

Referring to FIGS. 9, 10, 11 and 12, depression of control bar 330 serves three functions: that of rocking bail 95 to its inactive position, thereby disengaging the series of gears 90 from the corresponding gears 115 in the printhead 18, the rocking of the bail 138 to its active position whereby gears 90 are locked against rotation, followed by the closing of the motor switch to initiate a cycle of machine operation. Lever 142 is pivotally mounted on the reduced diametral end of pin 141 supported in bail 95. The horizontally extended offset distended end 354 of lever 142 is disposed within an elongated slot 355 (FIG. 2) of control slide 332. Normally, the end 354 of the lever 142 is maintained in engagement with the left end of the slot 355 (FIG. 2 or right end in FIG. 12) by means of a lever 356 pivoted at 357 on control slide 332. A spring 358, supported at its one end on a laterally projecting ear 359 of control slide 332 and at its other end on a lateral projection 360 of lever 356, normally serves to resiliently urge the shoulder 361 of the lever into engagement with the distended end 354 of lever 142. Upon manipulation of control bar 330 to move slide 332 upwardly, as viewed in FIG. 9, lever 142 is rocked clockwise on bail 95. During this initial movement of the lever 142, a pin 362, secured thereon and projecting downwardly through an arcuate slot in the arm 93 of bail 95 and through a suitable aperture in the leg 140 of the bail 138, rocks the bail 138 from its inactive position shown in FIG. 11 to the active position shown in FIG. 9, locking the series of gears 90 against rotation. Upon further clockwise movement, the lever 142 becomes effective to rock bail 95 clockwise (FIG. 9) to disengage the series of gears 90 from the corresponding print-head gears 115, at the same time enabling bail 126 to lock type wheel detents 122 in their detenting position. Immediately following release of the bail 95 from its active engagement with print-head 18, the extremity of the right angle extension of an upright arm 363, carried by lever 142, engages an insulated button 364 of a motor switch 365 (FIG. 10), thereby initiating cyclic operation of the print-head 18.

Upon full depression of control bar 330, i.e., until shoulder 334 of control slide 332 engages auxiliary frame member 85, means become effective to releasably latch the slide 332 in its actively moved position. For this purpose, a latch lever 370 is rockably supported adjacent control slide 332 on the extension of pivot 357 for lever 356. At its one end, latch lever 370 carries a laterally projecting ear 371 underlying the lower edge of lever 356, and at its other end, the lever 370 is provided with a latching tooth 372. Normally, a spring 373 urges latch lever 370 clockwise to the position shown in FIG. 2, wherein the ear 371 is maintained in engagement with the lower edge of the lever 356. As the control slide 332 is moved to the left (FIG. 2) to its active position against the urgency of the spring 335, the leading edge of the tooth 372 of latch lever 370 engages the control slide extension 374 of meter frame plate 63, rocking the latch lever counter-clockwise. As the slide 332 reaches its extreme position, the tooth 372 drops behind the frame extension 374, as seen in phantom line in FIG. 12, thereby preventing release of the control slide 332 to its inactive position.

It will be remembered that if any one or all of the series of gears 90 in the bail 95 receive a partial rotation, for example, by a partial angular rotation of a selector wheel 14, the knife edge of the bar 143 (FIG. 11) will engage the top of the adjacent tooth, thereby preventing rocking movement of the bail 138. In this condition of the parts, an attempt to move control slide 332 to its active position is prevented by the locking engagement of the shoulder 147 on the arm 145 of bail 138 with the auxiliary frame plate 85, as seen in FIG. 11.

Normally, print-head 18 is driven in a counterclockwise direction (FIG. 4) to cause a postmark impression to be made upon an envelope or other mail matter. In order to prevent a fraudulent use of the meter, i.e., the taking of an impression from the indicia by manual manipulation of the print-head, with the power source disconnected, a camming disk 375 is secured on the end plate 118 of print-head 18 and is provided on its periphery with a series of ratchet teeth 376. Immediately, upon the beginning of the printing phase of each cycle of rotation of the print-head 18, the ratchet teeth 376 are engaged by the pointed nose 377 of a pawl 378 pivoted at 379 on frame member 63. The nose 377 of the pawl 378 is resiliently maintained in engagement with the teeth 376 by spring 380 for the duration of the printing phase of each cycle of meter operation. Thus, it can be seen that once the printing phase of the operation has begun and as it continues with the counter-clockwise rotation of the print-head 18 (FIG. 4), the nose 377 of the pawl 378 ratchets over teeth 376 and serves to prevent a contrarotation of the print-head 18.

Immediately, upon conclusion of each cycle of rotation of the print-head 18, the meter operation is terminated by disabling control slide latch 370 to enable the return of the control slide 332 and control bar 330 to its inactive position, thereby effecting opening of the motor switch 365. To this end, pawl 378 carries a lateral projection 384 underlying a pin 385 on lever 356. At the conclusion of the cycle of rotation of print-head 18, the nose 377 of pawl 378 rides over cam lobe 386, rocking the pawl clockwise (FIG. 4) so that projection 384 engages pin 385 to impart a clockwise rotation to lever 356 (FIG. 12). Immediately thereafter, the nose 377 drops into the full-cycle notch 387 in cam disk 375. Lever 356 overlying ear 371 of control slide latch 370 becomes effective, with the rocking thereof, to impart a clockwise rocking movement to the latch 370, thereby releasing control slide 332 to the influence of the spring 335. Simultaneously therewith, the shoulder 361 of lever 356 is rocked out of engagement with the distended end 354 of the lever 142, releasing the lever 142 to the urgency of the spring 100. However, spring 335 coacts with spring 100 so that the position of the distended end 354 of the lever 142 is not altered in the slot 355 during the return of the control slide 332 and lever 142 to their inactive position. As the lever 142 returns to its inactive position, motor switch 365 is opened and the bail 95 is again restored to its active position with respect to print-head 18. Upon termination of the operation and the return of the nose 377 of pawl 378 into the full-cycle notch 387 of the cam disk 375, lever 356 is restored to its normal position shown in FIG. 12 and control slide latch 370 is likewise restored to its inactive position shown in FIG. 2.

Should the control bar 330 and its slide 332 be held depressed throughout a cycle of operation of the meter, the cam disk 375 will function as just described to terminate the cycle of rotation of print-head 18, whereby lever 356 will be rocked clockwise (FIG. 12) to disengage shoulder 361 from the distended end 354 of the lever 142. Thereupon, lever 142 and bail 95 will be released to the influence of spring 100 opening motor switch 365. Thus, the end 354 of the lever 142 moves over the top of the lever 356, retaining the lever in its rocked condition and latch 370 disabled. Upon release of the control bar 330, thereafter, the slide 332 returns to its inactive position, under the urgency of the spring 335, and the lever 356 is again restored to its normal condition, as viewed in FIG. 12, under the influence of the spring 358.

It will be recalled that upon restoration of the three highest ordinal dials 264 of the descending register 47 to the "0" registering position, the U-shaped arms 267 associated therewith become effective to lock the descending register 47 against subsequent registrations therein and to prevent cyclic operation of the meter unit. At this time, i.e., during the tens-transfer phase of the operation, the ear 270 of arm 269 (FIG. 8) is rocked by means of its spring 271 into engagement with the top edge of the right angle extension of arm 256 of three-arm bellcrank 248. Immediately thereafter, upon counter-clockwise rotation of bellcrank 248, the ear 270 moves further downwardly into engagement with the surface 273 of the right angle extension of arm 256, thereby preventing return of the three-arm bellcrank 248 to the normal position shown in FIG. 8 and retaining the hook portion of arm 257 in the rotational plane of pin 246 on the toothed pulley 240. Thus, subsequent operation of the meter unit is precluded. In this condition and as three-arm bellcrank 248 is rocked counter-clockwise to its meter locking position, a lever arm 388 (FIGS. 2 and 8) becomes effective to prevent depression of control bar 330 and movement of control slide 332 to its active position. The lever arm 388 is pivotally mounted at 389 on arm 257 of bellcrank 248 adjacent the end thereof. At its free end, arm 390 of lever 388 carries a pin supporting the lower end of a relatively light spring 391, the upper end of which is supported by a stud on the arm 256 of bellcrank 248. Spring 391 normally urges lever arm 388 counter-clockwise to a position determined by the engagement of the arm 390 of the lever with the pin 392 on arm 257.

Remembering that the control bar 330 and control slide 332 will be latched in the active position during the "lock-up" cycle of the meter unit and upon counter-clockwise rocking of the three-arm bellcrank 248, the end portion of the other arm 393 of lever 388 will engage with the top surface of the shank of the control bar 330, tensioning spring 391. The lever 388 will remain in this position until termination of the cycle of operation, whereupon control slide 332 will be released for return to its inactive position and spring 391 will become effective to rock lever 388 to position the end portion of the arm 393 in the path of travel of the control bar 330 for engagement by the shoulder 394 (FIG. 2) of the shank of the control bar, thereby preventing a subsequent movement of the control slide 332 to its active position. Adjacent its free end, arm 393 of lever 388 carries a pin 399 which serves to maintain a spaced relationship of the arm 393 with frame member 63 and to prevent deflection of the arm 393, when in its operative position, upon an attempt to depress bar 330.

Following the printing of a postmark on each envelope and the restoration of the platen roller 288 to its inoperative position relative to print-head 18, the envelope is immediately ejected for retrieval by the operator. For this purpose, the ejector slide 339 (FIGS. 2, 8, 21 and 22) is supported for slidable movement, parallel to the movement of the envelope through the printing station, by the engagement of suitable headed pins engaged in an elongated slot 395 in the slide 399, the pins being secured in respective spaced bosses 396 integrally formed on the lower surface of the cover plate 282 of base portion 10. As explained hereinbefore, the upright arm 338, formed at right angles to slide 339, projects upwardly through the slot 397 (FIGS. 8 and 19) in cover plate 282 and provides a limit stop for the leading edge of the envelope when inserted in the machine for the printing operation. The slide 339 and arm 338 are resiliently maintained in the position shown in FIG. 8 by a spring 398. Following the insertion of the envelope into printing position and the initiation of a meter operation to move platen roller 288 into operative relationship with print-head 18, the counter-clockwise rotation of the print-head 18 will be ineffective to move the envelope until the serrations 318 on the print-head engage the envelope, moving the envelope to the right in FIG. 8 for the impression of the postmark. During this movement of the envelope and by virtue of the engagement of the leading edge of the envelope with the upright arm 338, ejector slide 339 is also moved to the right, tensioning spring 398. Thus, upon termination of the meter operation and the release of the platen roller 288 to the inactive position shown in FIG. 8, the tensioned spring 398 becomes effective to immediately restore ejector slide 339 to its normally inactive position, thereby ejecting the printed envelope to the left.

What is claimed is:

1. In a printing device, the combination of a rotary print-head having a full-cycle position,
   a series of type wheels mounted for selective adjustment in said print-head,
   a selector mechanism including a plurality of manually settable members, one for each of said type wheels,
   means operatively connecting said settable members with said type wheels to control the adjustment of said type wheels in the full-cycle position of said print-head and movable to an inoperative position to enable rotation of said print-head,
   a power means for imparting rotation to said print-head,
   means manually adjustable to move said connecting means to the inoperative position and to initiate operation of said power means,
   a lock means normally operable to prevent adjustment of said adjustable means disabled by matter to be printed upon insertion thereof into printing position relative to said print-head,
   a platen means movable from a normally inactive position to an active position relative to said print-head and operable in the active position to effect an impression by said print-head upon matter passing therebetween,
   a power operated means for maintaining said platen means in the inactive position in the full-cycle position of said print-head,
   means driven by said power means operable in timed relation to the rotation of said print-head to supersede the operation of said power operated means and move said platen means to active position,
   a latching means effective to retain said manually adjustable means in adjusted position, and
   a latch releasing means rendered operable by said print-head upon rotation into the full cycle position thereof to terminate operation of said power means, to restore said connecting means to the operative position relative to said print-head and to enable operation of said power operated means.

2. In a device of the character described in claim 1, wherein said connecting means comprises a train of a plurality of sets of gears, one of said sets of gears connected to said settable members for rotation thereby, a second set of said sets of gears enmeshed with said one set of gears and a third set of said sets of gears enmeshed with said second set of gears and normally operatively connected to said type wheels to effect adjustment of said wheels in accordance with the setting of said settable members, a bail for supporting said second and said third sets of gears rockable about the axis of said one set of gears to an inoperative position disconnecting said third set of gears from said type wheels, and a lever having a lost motion connection with said bail operated by said manually adjustable means to rock said bail to the inoperative position.

3. In a device of the character described in claim 2 including means normally disengaged from said third set of gears operated by said lever during the lost motion thereof for engagement with said third set of gears thereby preventing operation of said settable members upon operation of said manually adjustable means.

4. In a device of the character described in claim 1 wherein said platen means comprises a roller, and means supporting said roller in axial parallel relationship to said print-head normally maintained in the inactive position relative thereto by said power operated means and rockable to the active position by said power driven means.

5. In a device of the character described in claim 4 wherein said power operated means comprises a spring superseded in its operation by said power driven means to rock said roller supporting means to active position.

6. In a device of the character described in claim 5 wherein said power driven means comprises a cam driven by said power means upon operation of said manually adjustable means, and a cam follower operatively connected to said roller supporting means and maintained in engagement with said cam by said spring.

7. In a postage metering machine having a value selection mechanism including a plurality of selectively settable members, a rotary indicia print-head, printing devices in said print-head including a plurality of adjustable numeral type wheels and an indicia type, said print-head being rotatable from a full-cycle position, adjustable means normally operatively positioned relative to said print-head for operation by said selection mechanism to adjust said type wheels, a power means for imparting rotation to said print-head, a manually operable control means, and a printing mechanism, the combination comprising means operated by said manually operable means to adjust said adjustable means to an inoperative position and to initiate operation of said power means, a platen means movable from a normally inoperative to an operative position relative to said print-head for the taking of an impression from said indicia type and said type wheels, and means driven by said power means operable upon operation of said manually operable control means to move said platen means to operative position in timed relation to the rotation of said print-head from the full-cycle position.

8. In a postage metering machine having a value selection mechanism including a plurality of selectively settable members, a rotary indicia print-head, printing devices in said print-head including a plurality of adjustable numeral type wheels and an indicia die, said print-head being rotatable from a full-cycle position, means operated by said settable members for adjusting said type wheels, means for disabling said adjusting means, a power driven means for effecting rotation of said print-head, and a printing mechanism, the combination comprising a manual control means for operating said disabling means and initiating operation of said power driven means, means for retaining said manual control means in the active position, a platen means adjustable from a normally inoperative to an operative position relative to said print-head to effect the taking of an impression from the indicia die and type wheels, means controlled by said power driven means upon operation of said manual control means to adjust said platen means to the operative position in timed relation to the rotation of said print-head, and a cyclic control means operable to disable said retaining means upon completion of a cycle of rotation of said printing head.

9. In a device of the character described in claim 8 wherein said platen means comprises a roller, a carrier supporting said roller rockable between an inoperative and operative position under control of said controlled means, and a biasing means associated with said carrier operable to yieldably maintain said roller in the operative position relative to said print-head upon operation of said controlled means.

10. In a device of the character described in claim 9 wherein said controlled means comprises a cam-operated means rendered operable by said power driven means to control the rocking movement of said carrier.

11. In a device of the character described in claim 10 wherein said cam-operated means comprises a cam driven by said power driven means, a cam follower for said cam operable upon operation of said power driven means to rock said carrier thereby moving said roller into operative relationship to said print-head in timed relation to the rotation of said print-head, and a resilient means for normally maintaining said carrier in the inoperative position in the full-cycle position of said print-head and for retaining said cam follower in active engagement with said cam.

12. In a postage metering machine, a value selection mechanism including a plurality of selectively settable members, an ascending register and a descending register, an actuating means for effecting registration of a value in said selection mechanism in each of said registers in accordance with the setting of said settable members, a rotary indicia print-head having a full-cycle position, printing devices in said print-head including a plurality of adjustable numeral type wheels and an indicia die operable to print a postmark on mail matter, adjusting means associated with said selection mechanism operable to control the adjustment of said type wheels in accordance with the setting of said settable members, a power means for imparting rotation to said print-head and effecting operation of said actuating means, a manual control means movable from a normally inactive to an active position to initiate operation of said power means, means for latching said manual control means in the active position, a platen means normally inoperatively positioned relative to said print-head and movable to the operative position to cause a postmark impression to be made on mail matter passed therebetween upon rotation of said print-head, means driven by said power means operable in timed relation to the rotation of said print-head from full-cycle position to move said platen means from the inoperative to the operative position, and a cyclic control means operable upon completion of each cycle of rotation of said print-head to release said latching means thereby terminating operation of said power means.

13. In a device of the character described in claim 12 including means for preventing movement of said manual control means to active position disabled by each piece of mail matter to be printed upon insertion thereof into printing position relative to said print-head.

14. In a device of the character described in claim 12 wherein said adjusting means comprises a gear means movable between an active and inactive position relative to said print-head and operable in the active position to connect said settable members with said type wheels thereby enabling adjustment of said type wheels in accordance with the setting of said settable members, means supporting said gear means operable by said manual control means upon movement to active position to move said gear means from the active to the inactive position, and a spring means normally biasing said supporting means and said gear means to the active position.

15. In a device of the character described in claim 14 including a rockable member mounted for limited rocking movement on said supporting means and operatively connected to said manual control means for operation thereby, and a locking means carried by said supporting means for control by said rockable member during the limited movement thereof to engage said gear means to lock said gear means and said settable members in an adjusted position upon partial movement of said manual control means, said rockable member being effective upon continued movement of said manual control means to active position to control operation of said supporting means and to initiate operation of said power means.

16. In a device of the character described in claim 15 wherein said manual control means comprises a slide member having a delatchable connection with said rockable member, said slide member being movable from the normally inactive to the active position and being retained in the active position by said latching means, a resilient means for urging said slide member to the inactive position, and a latch releasing means rendered operable by said cyclic control means upon completion of a cycle of operation of said print-head to release said latching means thereby enabling operation of said spring means and said resilient means to terminate operation of said power means.

17. In a device of the character described in claim 16 wherein said latch releasing means is normally operable to maintain the delatchable connection of said rockable member with said slide member latched and is effective upon operation of said cyclic control means to delatch said rockable member from said slide member thereby enabling said spring means upon retention of said slide member in the active position.

18. In a device of the character described in claim 12 wherein said platen means comprises a roller, means supporting said roller in axial parallel relationship to said print-head rockable by said power driven means from a normally inoperative to an operative position to move said roller into printing relationship to said print-head, and a pressure means yieldably operable to maintain said roller in printing position relative to said print-head upon movement of said supporting means to operative position.

19. In a device of the character described in claim 18 wherein said power driven means comprises a cam driven by said power means and having a full-cycle position corresponding to the full-cycle position of said print-head, a cam follower associated with said cam and operable upon operating of said cam to move said roller supporting means from the inoperative to the operative position in timed relation to the rotation of said print-head, and means biasing said cam follower into engagement with said cam normally operable in the full-cycle position of said cam to maintain said roller supporting means in the inoperative position.

20. In a device of the character described in claim 12 wherein said print-head having peripheral serrations thereon adjacent the indicia die is effective upon the operation of said power means and the movement of said platen means to operative position to move mail matter between said print-head and said platen means for the printing of a postmark.

21. In a device of the character described in claim 20 including means rendered operable by each piece of mail matter during rotation of said print-head to eject said mail matter upon termination of operation of said power means.

References Cited
UNITED STATES PATENTS

| | | | |
|---|---|---|---|
| 2,152,204 | 3/1939 | Moore | 101—91 |
| 2,187,456 | 1/1940 | Komusin | 235—101 |
| 2,350,703 | 6/1944 | Ryan et al. | 101—235 |
| 2,371,070 | 3/1945 | Sager et al. | 101—91 |
| 2,931,294 | 4/1960 | Ritzerfeld et al. | 101—132.5 |
| 2,967,477 | 1/1961 | Ritzerfeld et al. | 101—132.5 |
| 3,037,447 | 6/1962 | Gonzalez et al. | 101—91 |
| 3,107,854 | 10/1963 | Lundquist | 235—101 |
| 3,191,526 | 6/1965 | Ross | 101—91 |
| 3,216,351 | 11/1965 | Ritzerfeld et al. | 101—235 |
| 3,238,868 | 3/1966 | Ritzerfeld et al. | 101—91 |

WILLIAM B. PENN, *Primary Examiner.*

UNITED STATES PATENT OFFICE
CERTIFICATE OF CORRECTION

Patent No. 3,363,549                                  January 16, 1968

John F. Reus et al.

It is hereby certified that error appears in the above numbered patent requiring correction and that the said Letters Patent should read as corrected below.

Column 1, lines 21 and 22, for "initiaton" read -- initiation --; lines 32 and 33, strike out "This invention relates to a postage metering machine and more particularly to the controls therefor."; column 2, line 36, for "data" read -- date --; column 5, line 30, for "member" read -- member 85 --; column 6, line 2, for "U-shapel" read -- U-shaped --; line 49, for "dentent" read -- detent --; line 50, for "coresponding" read -- corresponding --.

Signed and sealed this 25th day of March 1969.

(SEAL)
Attest:

Edward M. Fletcher, Jr.                              EDWARD J. BRENNER
Attesting Officer                                    Commissioner of Patents